(12) United States Patent
DeWitt et al.

(10) Patent No.: US 8,995,927 B2
(45) Date of Patent: Mar. 31, 2015

(54) COMMUNICATION BETWEEN A RECEIVER AND A TRANSMIT CONTROLLER

(75) Inventors: Gary M. DeWitt, Plano, TX (US); Brad Shirley, Plano, TX (US); Chris S. Russell, Richardson, TX (US); Larry DeFauw, Dallas, TX (US)

(73) Assignee: Traxxas LP, McKinney, TX (US)

( * ) Notice: Subject to any disclaimer, the term of this patent is extended or adjusted under 35 U.S.C. 154(b) by 823 days.

(21) Appl. No.: 12/730,036

(22) Filed: Mar. 23, 2010

(65) Prior Publication Data

US 2011/0059760 A1 Mar. 10, 2011

Related U.S. Application Data

(60) Provisional application No. 61/241,340, filed on Sep. 10, 2009, provisional application No. 61/266,923, filed on Dec. 4, 2009.

(51) Int. Cl.
*H04Q 5/22* (2006.01)
*G05B 11/01* (2006.01)
*G08C 17/02* (2006.01)

(52) U.S. Cl.
CPC ............ *G08C 17/02* (2013.01); *G08C 2201/20* (2013.01)
USPC .......... 455/68; 455/420; 340/12.5; 340/12.22

(58) Field of Classification Search
None
See application file for complete search history.

(56) References Cited

U.S. PATENT DOCUMENTS

| 5,252,965 | A | 10/1993 | Gidwani et al. |
|---|---|---|---|
| 5,937,065 | A | 8/1999 | Simon et al. |
| 6,127,941 | A | 10/2000 | Van Ryzin |
| 6,567,012 | B1 | 5/2003 | Matsubara et al. |
| 6,658,328 | B1 | 12/2003 | Alrabady et al. |
| 6,741,684 | B2 | 5/2004 | Kaars |
| 7,174,518 | B2 | 2/2007 | Kim |
| 7,224,262 | B2 | 5/2007 | Simon et al. |
| 7,231,294 | B2 | 6/2007 | Bodin et al. |
| 7,233,844 | B2 | 6/2007 | Peltz et al. |
| 7,268,664 | B2 | 9/2007 | Tanaka et al. |
| 7,307,573 | B2 | 12/2007 | Choi |
| 7,391,320 | B1 | 6/2008 | Beard et al. |

(Continued)

FOREIGN PATENT DOCUMENTS

CN 101505380 A 8/2009
DE 10 2007 038 666 A1 2/2009

(Continued)

OTHER PUBLICATIONS

Spektrum; "3-Channel, 4-Model Memory DSM Racing System" instruction manual; Horizon Hobby Inc., Champaign IL, Aug. 2009.

(Continued)

*Primary Examiner* — Philip Sobutka
(74) *Attorney, Agent, or Firm* — CARR Law Firm PLLC

(57) ABSTRACT

A method for a radio control transmit controller communicating with exactly one radio control receiver is provided. Two or more identifiers are stored in a radio control transmit controller. Each identifier is an identifier of a radio control transmit controller. The transmit controller receives a link request from a first radio control receiver. The link request includes an identifier of the first receiver. The transmit controller determines if the identifier of the first receiver is in the two or more identifiers. If the identifier of the first receiver is in the two or more identifiers, the transmit controller transmits a link response to the first receiver.

46 Claims, 10 Drawing Sheets

(56) References Cited

U.S. PATENT DOCUMENTS

| | | | |
|---|---|---|---|
| 7,486,193 B2 | 2/2009 | Elwell | |
| 7,681,194 B2 | 3/2010 | Van Ee et al. | |
| 8,138,894 B2 | 3/2012 | Kato et al. | |
| 2002/0187726 A1 | 12/2002 | Yamaguchi | |
| 2003/0148703 A1 | 8/2003 | Scott et al. | |
| 2004/0018800 A1 | 1/2004 | Caiozza | |
| 2004/0179469 A1* | 9/2004 | Attar et al. | 370/208 |
| 2005/0048918 A1 | 3/2005 | Frost et al. | |
| 2005/0088275 A1 | 4/2005 | Valoteau et al. | |
| 2007/0001805 A1* | 1/2007 | Utter et al. | 340/5.72 |
| 2007/0035412 A1 | 2/2007 | Dvorak et al. | |
| 2007/0293124 A1 | 12/2007 | Smith et al. | |
| 2008/0285626 A1 | 11/2008 | Claus et al. | |
| 2008/0285628 A1 | 11/2008 | Gizis et al. | |
| 2009/0195407 A1 | 8/2009 | Nakano et al. | |
| 2009/0262002 A1 | 10/2009 | Alexander et al. | |
| 2011/0288696 A1 | 11/2011 | Lefebure | |

FOREIGN PATENT DOCUMENTS

| | | | |
|---|---|---|---|
| EP | 1736948 A1 | 12/2006 | |
| JP | 5086759 A | 4/1993 | |
| JP | 5106376 A | 4/1995 | |
| JP | 2002-345050 A | 11/2002 | |
| JP | 2004-64418 A | 2/2004 | |
| JP | 2009-177767 A | 8/2009 | |
| WO | WO 2010/042219 A2 | 4/2010 | |

OTHER PUBLICATIONS

European Patent Application No. EP10175799.5; Extended European Search Report; Aug. 21, 2012.
European Patent Application No. EP10175809.2; Extended European Search Report; Aug. 21, 2012.
European Patent Application No. EP10175814.2; Extended European Search Report; Sep. 6, 2012.
The State Intellectual Property Office of the People's Republic of China; "The First Office Action", Appl'n. No. 201010602928.9; Dec. 25, 2012.
The State Intellectual Property Office of the People's Republic of China; "The First Office Action", Appl'n. No. 201010602870.8; Jan. 17, 2013.
U.S. Appl. No. 12/760,026; Office Action 1-NF; Mar. 27, 2012.
U.S. Appl. No. 12/730,026, Office Action 2-FR; Jan. 14, 2013.
U.S. Appl. No. 12/730,005; Office Action 1-NF; Sep. 28, 2012.
U.S. Appl. No. 12/850,453; Office Action 1-NF; Jun. 20, 2012.
U.S. Appl. No. 12/850,453; Office Action 2-FR; Feb. 26, 2013.
European Patent Application No. EP11164210.4; Extended European Search Report; Sep. 19, 2011.
U.S. Appl. No. 12/730,026, Response; Sep. 24, 2012.
European Patent Application No. EP10175799.5; Response; Mar. 18, 2013.
European Patent Application No. EP10175809.2; Response; Mar. 18, 2013.
U.S. Appl. No. 12/850,453; Response; Dec. 17, 2012.
Horizon Hobby; "PC Data Transfer by JR"; http://www.horizonhobby.com/Products/Default.aspx?ProdID=JRPA310#quickOverview, Aug. 30, 2010.
Booker, Jim; "The JR Data Transfer Program Makes Model Setup Easy"; Horizon Hobby; Aug. 29, 2008; http://www.horizonhobby.com/Articles/Article.aspx?ArticleID=1827.
"JR Data Transfer How To: . . . Set Up Dual Aileron and Elevator"; Transcript of video presented by Horizon Hobby Aug. 29, 2008 at http://www.horizonhobby.com/Articles/Article.aspx?ArticleID=1827.
Parry, Bill; "Clip-on Wireless Telemetry from Eagle Tree Systems!", message posted Apr. 27, 2004 by 'billpa', "Bill From Eagle Tree Systems here, . . . "; http://forums.radiocontrolzone.com/showthread.php?t=165955.
U.S. Appl. No. 12/730,005; Response; Mar. 27, 2013.
Horizon Hobby; "JR PC Data Transfer Instruction Manual"; Horizon Hobby Inc., Champaign IL; Aug. 2008.
Eagle Tree Systems; "Preliminary Information for the Seagull Wireless Telemetry System"; Eagle Tree Systems, Bellevue WA; Aug. 12, 2004; http://web.archive.org/web/20040812123921/http://eagletreesystems.com/News/news.html.
Eagle Tree Systems; "Wireless Telemetry and Advanced Data Recording for Model Cars/Trucks"; Eagle Tree Systems, Bellevue WA; Dec. 20, 2005; http://www.eagletreesystems.com/Car/car.html.
Eagle Tree Systems; "Instruction Manual for the USB Flight Data Recorder"; Eagle Tree Systems, Bellevue WA; Jun. 2003.
Chinese Patent Appl'n. No. 201010602895.8; Office Action 1; Mar. 5, 2013.
U.S. Appl. No. 12/730,005; Office Action 2-FR; Jul. 1, 2013.
U.S. Appl. No. 12/730,005; Response; Oct. 1, 2013.
U.S. Appl. No. 12/730,005; Office Action 3-FR; Oct. 25, 2013.
U.S. Appl. No. 12/730,026; Response; Jul. 11, 2013.
U.S. Appl. No. 12/730,026; Notice of Allowance; Aug. 29, 2013.
Chinese Patent Appl'n. No. 201010602895.8; Response to Office Action; Sep. 23, 2013.
Chinese Patent Appl'n. No. 201010602928.9; Response to Office Action; May 9, 2013.
Chinese Patent Appl'n. No. 201010602870.8; Response to Office Action; Jun. 3, 2013.
Chinese Patent Appl'n. No. 201010602928.9; Office Action 2; Sep. 18, 2013.
Chinese Patent Appl'n. No. 201010602870.8; Office Action 2; Aug. 20, 2013.
European Patent Application No. 11164210.4; Response; May 1, 2013.
European Patent Application No. 11164210.4; Notice of Allowance; Dec. 14, 2012.
European Patent Application No. EP10175814.2; Response; Apr. 9, 2013.
Japanese Patent Appl'n. No. 2010-202389; Office Action 1; Dec. 27, 2011.
Japanese Patent Appl'n. No. 2010-202389; Response; May 28, 2012.
Japanese Patent Appl'n. No. 2010-202389; Decision to Grant; Jun. 12, 2012.
Japanese Patent Appl'n. No. 2010-202402; Office Action 1; Mar. 2, 2012.
Japanese Patent Appl'n. No. 2010-202402; Response; Sep. 3, 2012.
Japanese Patent Appl'n. No. 2010-202402;Decision to Grant; Sep. 21, 2012.
Japanese Patent Appl'n. No. 2010-202403; Office Action 1; Mar. 30, 2012.
Japanese Patent Appl'n. No. 2010-202403; Response; Nov. 27, 2012.
Japanese Patent Appl'n. No. 2010-202403; Office Action 2; Mar. 29, 2013.
Japanese Patent Appl'n. No. 2010-202403; Response; Aug. 29, 2013.
Japanese Patent Appl'n. No. 2010-202403; Office Action 3; Sep. 17, 2013.
Mexican Patent Appl'n. No. MX/A/2010/009963; Office Action 1; Sep. 13, 2012.
Mexican Patent Appl'n. No. MX/A/2010/009963; Response to OA1; Jan. 14, 2013.
Mexican Patent Appl'n. No. MX/A/2010/009963; Notice of Patent Grant; Apr. 5, 2013.
Mexican Patent Appl'n. No. MX/A/2010/009964; Office Action 1; Jun. 13, 2012.
Mexican Patent Appl'n. No. MX/A/2010/009964; Response to OA1; Oct. 12, 2012.
Mexican Patent Appl'n. No. MX/A/2010/009964; Notice of Patent Grant; Jan. 11, 2013.
Mexican Patent Appl'n. No. MX/A/2010/009965; Office Action 1; Sep. 13, 2012.
Mexican Patent Appl'n. No. MX/A/2010/009965; Response; Jan. 10, 2013.
Mexican Patent Appl'n. No. MX/A/2010/009965; Notice of Patent Grant; Apr. 5, 2013.
Chinese Patent Appl'n No. 201010602895.8; Office Action 1; Mar. 5, 2013.

(56) References Cited

OTHER PUBLICATIONS

Horizon Hobby; "QuickConnect Voltage Recovery System for DSM2 Air receivers"; Horizon Hobby, Inc.; Dec. 1, 2008. https://www.spektrumrc.com/Articles/Article.aspx?ArticleID=1855.
RC Universe; "Spektrum Receiver new "Quick Connect" feature"; www.rcuniverse.com/forum; Dec. 18, 2007. http://www.rcuniverse.com/forum/jr-radio-spektrum-radios-116/6773703-spektrum-receiver-new-quick-connectfeature.html#post6773703.
Spektrum; "Spektrum DX6i • Radio Programming Guide"; Horizon Hobby, Inc.; Aug. 2009. http://www.spektrumrc.com/ProdInfo/Files/SPM6600-Manual_DX6i.pdf.
U.S. Appl. No. 12/730,026; Office Action 1-NF; Mar. 27, 2012.
English Translation—Mexican Patent Appl'n No. MX/A/2010/009963; Response to OA1; Jan. 14, 2013.
Spektrum RC; "ModelMatch"; Horizon Hobby Inc., Champaign IL; Jan. 2005; http://www.spektrumrc.com/DSM/Technology/modelmatch.aspx.
Futaba; "FASST 2.4GHz Module & R603FS Receiver" brochure; Great Planes Model Distr. Co., Champaign IL, Jan. 2006.
Futaba; "Futaba 2.4GHz FASST System Features"; Hobbico Inc., Jan. 2007; http://2.4gigahertz.com/features/features.html.
Futaba; "3GR-2.4GHz System" manual; Futaba Corp., Japan, Jan. 2007.
Futaba; "3PM w/2.4GHz Fasst System" brochure; Great Planes Model Distr. Co., Champaign IL, Jan. 2007; www.2.4gigahertz.com.
Futaba; "3PM-2.4GHz System" manual; Futaba Corp., Japan, Jan. 2007.
Futaba; "4PK 4-Channel Computer Systems" brochure; Great Planes Model Distr. Co., Champaign IL, Jan. 2007.
Futaba; "6EX w/2.4GHz FASST System" brochure; Great Planes Model Distr. Co., Champaign IL, Jan. 2007.
Futaba; "6EX-2.4GHz Instruction Manual"; Futaba Corp., Japan, Jan. 2007.
Futaba; "Manual Changes—Instruction Manual—Throttle-cut function" (6EX addendum); Futaba Corp., Japan, Jan. 2008.
Futaba; "7C 7-Channel FASST Computer System" brochure; Great Planes Model Distr. Co., Champaign IL, Jan. 2007.
Futaba; "7C-2.4GHz Instruction Manual"; Futaba Corp., Japan, Jan. 2007.
Futaba; "12FG 12-Channel Computer Systems" brochure; Great Planes Model Distr. Co., Champaign IL, Jan. 2007.
Futaba; "FASST Air System TM-7 RF Module and R607FS Receiver Instruction Manual"; Futaba Corp., Japan, Jan. 2007.
Futaba; "FASST Air System TM-14 RF Module and R6014FS Receiver Instruction Manual"; Futaba Corp., Japan, Jan. 2007.
Futaba; "FASST Air System TM-8 RF Module and R608FS Receiver Instruction Manual"; Futaba Corp., Japan, Jan. 2008.
Futaba; "4PK-2.4GHz System" manual; Futaba Corp., Japan, Jan. 2008.
Futaba; "Futaba Model Data Converter" manual; Futaba Corp., Japan, Jan. 2008.
Futaba; "R6004FF" receiver manual; Futaba Corp., Japan, Jan. 2008.
Futaba; 10CAP/10CHP/10CP 10-Channel Radio Control System Instruction Manual; Futaba Corp., Japan, Jan. 2008.
Futaba; "3PM-X 3-Channel 2.4GHz FASST Computer System" brochure; Great Planes Model Distr. Co., Champaign IL, Hobbico Inc. Jan. 2009.
Futaba; "3PM-2.4G MX 3-channel FASST Radio control system for car Instruction Manual"; Futaba Corp., Japan, Jan. 2009.
Futaba; "8FG FASST 8-Channel 2.4GHz Computer System" brochure; Great Planes Model Distr. Co., Champaign IL, Hobbico Inc. Jan. 2009.
Futaba; "8FG 8-Channel Radio Control System Instruction Manual"; Futaba Corp., Japan, Jan. 2009.
Futaba; 10CAG/10CHG/10CG 10-Channel Radio Control System Instruction Manual; Futaba Corp., Japan, Jan. 2009.
Futaba; "Wireless Trainer System WTR-7 Instruction Manual"; Futaba Corp., Japan, Jan. 2009.
Futaba; "R6108SB S.BUS compatible/FASST-2.4GHz (Multi-ch) system 8 channels/high-speed receiver" manual; Futaba Corp., Japan, Jan. 2010.
Futaba; "S.BUS Decoder SBD-1 Instruction Manual"; Futaba Corp., Japan, Jan. 2010.
Futaba; "S.BUS Servo Usage Precautions" manual; Futaba Corp., Japan, Jan. 2010.
Futaba; "S.BUS System Channel Changer SBC-1 Instruction Manual"; Futaba Corp., Japan, Jan. 2010.
Futaba; "We Put the Future of R/C in Your Hands" catalog; Hobbico, Inc., Jan. 2010; futaba-rc.com, www.2.4gigahertz.com.
Mexican Patent Appl'n No. MX/A/2011/004714; Office Action 1; Feb. 12, 2013.
Mexican Patent Appl'n No. MX/A/2011/004714; Response 1; Apr. 8, 2013.
Mexican Patent Appl'n No. MX/A/2011/004714; Report Patent Grant; Jun. 19, 2013.
U.S. Appl. No. 12/850,453; Response-IDS; Aug. 26, 2013.
European Patent Application No. 11164210.4; Grant Decision: Aug. 29, 2013.
Japanese Patent Appln. No. 2012-120958; Request Examination & Amendment; Sep. 9, 2013.
U.S. Appl. No. 12/850,453; Office Action 3-NF; Sep. 20, 2013.
European Patent Application No. 11164210.4; Notice of Allowance; Oct. 7, 2013.
European Patent Application No. EP10175814.2; Notice of Allowance; Oct. 21, 2013.
Chinese Patent Appl'n No. 201010602928.9; Response 2; Dec. 3, 2013.
Chinese Patent Appl'n No. 201010602870.8; Response Jan. 6, 2014.
European Patent Application No. EP10175809.2; Notice of Allowance; Jan. 7, 2014.
Japanese Patent Appl'n No. 2010-202403; Response; Jan. 17, 2014.
Chinese Patent Appl'n No. 201010602895.8; Office Action 2; Feb. 24, 2014.
U.S. Appl. No. 12/850,453; Response; Mar. 20, 2014.
Chinese Patent Appl'n No. 201010602895.8; Response 2; Apr. 8, 2014.
Japanese Patent Appl'n No. 2010-202403; Grant Decision; Apr. 9, 2014.
Chinese Patent Appl'n No. 201010602928.9; Office Action 3; Apr. 17, 2014.
Japanese Patent Appl'n No. 2011-102822; Request for Examination; May 2, 2014.
European Patent Application No. EP10175809.2; Preliminary Amendment; May 8, 2014.
European Patent Application No. EP10175814.2; Preliminary Amendment; May 8, 2014.
Chinese Patent Appl'n No. 201010602870.8; Grant Decision; May 12, 2014.
U.S. Appl. No. 12/850,453; Office Action 4-FR; Jun. 3, 2014.
U.S. Appl. No. 12/300,005; Office Action 4-NF; May 2, 2014.
European Patent Application No. EP10175809.2; Examination Report Jun. 24, 2014.
European Patent Application No. EP10175814.2; Examination Report Jun. 3, 2014.
Japanese Patent Appln No. 2012-120958; Office Action 1 Apr. 18, 2014.
Japanese Patent Appln No. 2011-102822; Voluntary Amendment; Jun. 11, 2014.

* cited by examiner

COMMUNICATION BETWEEN A RECEIVER AND A TRANSMIT CONTROLLER

CROSS-REFERENCE TO RELATED APPLICATIONS

This application relates to, and claims the benefit of the filing date of, U.S. provisional patent application Ser. No. 61/241,340 entitled AUTO-LINKING FOR RADIO CONTROL UNITS, filed Sep. 10, 2009, and U.S. provisional patent application Ser. No. 61/266,923, entitled AUTO-LINKING FOR RADIO CONTROL UNITS, filed Dec. 4, 2009. The entire contents of these applications are incorporated herein by reference for all purposes, with the exception of certain statements in U.S. provisional patent application Ser. No. 61/241,340 which are retracted in an Information Disclosure Statement filed concurrently with this application.

TECHNICAL FIELD

The present invention relates to linking radio control units and, more particularly, to linking a radio frequency transmit controller to a radio frequency unit.

BACKGROUND

Today's radio control (R/C) hobbyist has a large selection of reasonably priced R/C units to choose from in a rapidly growing industry. Commercial and military applications are also becoming more prevalent as R/C technologies improve performance, reduce latency, and improve reliability.

Modern digital radios allow for many users to be operating their units at the same time in close proximity to each other. This may be especially important in events where the desire is to have a large number of R/C units (up to hundreds of users) running simultaneously without interference.

Typically, a user may own multiple R/C units and have one or more radio frequency (RF) transmit controllers to operate the multiple R/C units. Typically, a transmit controller may be used by only one user and not shared. However, a single unit may be commonly shared among multiple users, such as members of the same household, each with their own transmit controller.

An R/C unit may be a remote control model vehicle. Each R/C unit may have an RF receiver installed during the manufacturing of the unit. The receiver may be associated with an RF transmit controller that may control the unit, and the RF transmit controller may be similarly associated with the receiver. These associations may be referred to as "bindings." The process of creating a binding may be referred to as "binding." A transmit controller with a binding to a receiver may be referred to as "bound" to the receiver, and a receiver with a binding to a transmit controller may be referred to as "bound" to the transmit controller.

To create a binding, a user may power up the transmit controller while pressing a set switch on the transmit controller, then power up the unit's receiver while pressing a link switch on the receiver. Within several seconds, the transmit controller and the receiver may "bind" by exchanging unique electronic signatures, or keys. Each may save a unique electronic signature of the other, so that each may recognize the other in the future. Despite their names, both the transmit controller and the receiver may be capable of both transmitting and receiving radio communications. Thus, the transmit controller and the receiver may each be called a "transceiver," but to distinguish between the two the terms "transmit controller" and "receiver" will be used herein.

When a previously bound receiver and transmit controller are to be used, each may need to discover the existence of the other, discover the existence of a binding to the other, and configure to communicate with the other. This process may be referred to as "linking." Linking may occur, for example, when the receiver and transmit controller are powered up. The electronic signatures saved when the receiver and transmit controller were bound may be used for the receiver and transmit controller to recognize each other. Linking may establish a communication channel between the receiver and the transmit controller. This communication channel may be referred to as a "link." A link may be for bidirectional communication.

Binding and linking may ensure a user's transmit controller controls only the user's unit, and not nearby units belonging to other users. A unit may react to commands from a transmit controller it is bound to, and may ignore commands from a transmit controller it is not bound to. Thus, multiple users may control multiple units in close proximity without interference.

Repeating the bind process may be time-consuming and inconvenient for users who switch between controlling multiple units with one transmit controller. For many units, the link switch for the unit's receiver may be located in a waterproof enclosure within the body of the unit. To access the link switch, a user may have to remove the body of the unit to gain access to the enclosure and open the enclosure using tools.

To reduce the need to repeat the bind process, some transmit controllers may be simultaneously bound to multiple units. Therefore, a user may link one of these transmit controllers with one of the multiple units without repeating the bind process.

The operation of a unit may be configured by setting various parameters. Some parameters may be set as a matter of preference, such as parameters for steering, braking, and throttle. Parameters may be set using a transmit controller.

While parameters such as steering, braking, and throttle may be set as a matter of preference, some units may have mandatory parameters which must be correctly set to properly control the unit. An example is the direction of rotation of steering servos. Some of a user's units may have steering servos right-side up, while other units may have steering servos upside down. Depending on the unit, the direction of rotation of the servos in response to control input may need to be reversed. This process is known is servo reversing or channel reversing.

If the direction of rotation of a unit's servos is not correctly set, the unit may turn in one direction when the user intends for the unit to turn in the opposite direction. As a result, the unit may crash, resulting in damage to the unit, damage to other property, and injuries to persons. This may be especially a concern with model ground vehicles that can travel at speeds of 40 to 60 miles per hour. This may also be especially a concern with model planes, which can be particularly likely to crash from a turn in the wrong direction.

A collection of parameter settings for a unit may be referred to as a "profile." A transmit controller may save multiple profiles, and a user may select one of the profiles for the transmit controller to load. A user who has multiple units may typically have one or more profiles specifically for each unit. When changing to a different unit, a user may select a profile for the unit rather than setting each parameter. However, if the user does not remember to change profiles when the user changes units, the transmit controller may use incorrect parameters to control the unit. If mandatory parameters such as the direction of rotation of steering servos are incorrectly set, the unit may crash.

It would be desirable if a transmit controller could automatically load a profile specific to the unit it is linked to. A user would then not need to remember to manually select a profile or set the parameters for the unit. This would be more convenient for the user and could prevent crashes caused by incorrect parameter settings.

Additionally, two or more persons, such as members of the same household, may share a unit. Each person may have a transmit controller and may wish to control the shared unit at different times. It would be desirable if a unit could be bound to multiple transmit controllers, so that the unit could automatically link to an available one of the transmit controllers without the need to repeat the bind process.

Additionally, a situation may arise where a transmit controller determines there are multiple receivers available to link to or a receiver determines there are multiple transmit controllers available to link to. In such a situation, it would be desirable if each transmit controller automatically linked to a single receiver and each receiver automatically linked to a single transmit controller. This can prevent undesirable outcomes such as a transmit controller that controls multiple units or a unit that responds to commands from multiple transmit controllers.

Thus, a need exists for a transmit controller which may automatically select a profile for each unit it links to. A need further exists for a receiver which may be bound to multiple transmit controllers. A need further exists for a transmit controller which may automatically link to only a single receiver of multiple available receivers and a receiver which may automatically link to only a single transmit controller of multiple available transmit controllers.

SUMMARY OF INVENTION

A method for a radio control transmit controller communicating with exactly one radio control receiver is provided. Two or more identifiers are stored in a radio control transmit controller. Each identifier is an identifier of a radio control transmit controller. The transmit controller receives a link request from a first radio control receiver. The link request includes an identifier of the first receiver. The transmit controller determines if the identifier of the first receiver is in the two or more identifiers. If the identifier of the first receiver is in the two or more identifiers, the transmit controller transmits a link response to the first receiver.

In another aspect of the invention, a radio control transmit controller configured to communicate with exactly one radio control receiver is provided. The radio control transmit controller is configured to store two or more identifiers. Each identifier is an identifier of a radio control transmit controller. The transmit controller is configured to receive a link request from a first radio control receiver. The link request includes an identifier of the first receiver. The transmit controller is configured to determine if the identifier of the first receiver is in the two or more identifiers. If the identifier of the first receiver is in the two or more identifiers, the transmit controller transmits a link response to the first receiver.

In another aspect of the invention, a method for a radio control receiver communicating with a radio control transmit controller exclusive of other radio control receivers is provided. Two or more identifiers are stored in a radio control receiver. Each identifier is an identifier of a radio control transmit controller. The receiver transmits a link request. The link request includes an identifier of the receiver. The receiver receives a link response. The link response includes an identifier of a first transmit controller. The receiver determines if the identifier of the first transmit controller is stored in the two or more identifiers. If the identifier of the receiver is stored in the two or more identifiers, the receiver transmits a link acknowledgment to the first transmit controller.

In another aspect of the invention, a radio control receiver configured to communicate with a radio control transmit controller exclusive of other radio control receivers is provided. The radio control receiver is configured to store two or more identifiers. Each identifier is an identifier of a radio control transmit controller. The radio control receiver is configured to transmit a link request. The link request includes an identifier of the receiver. The radio control receiver is configured to receive a link response. The link response includes an identifier of a first transmit controller. The radio control receiver is configured to determine if the identifier of the first transmit controller is stored in the two or more identifiers. The radio control receiver is configured to, if the identifier of the receiver is stored in the two or more identifiers, transmit a link acknowledgement to the first transmit controller.

DESCRIPTION OF DRAWINGS

For a more complete understanding of the present invention and the advantages thereof, reference is now made to the following Detailed Description taken in conjunction with the accompanying drawings, in which.

DETAILED DESCRIPTION OF THE INVENTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, specific details, and the like have been omitted inasmuch as such details are not considered necessary to obtain a complete understanding of the present invention, and are considered to be within the understanding of persons of ordinary skill in the relevant art.

The present invention may provide for linking of a transmit controller ("Tx") to a receiver ("Rx") by providing a transmit controller and a receiver which each may automatically save a list of bindings. During the first several seconds of powering up a previously bound transmit controller and receiver, a mutual linking process may begin. The mutual linking process may automatically link the transmit controller and receiver via an exclusive radio link. The transmit controller may automatically select a profile specific to the unit from multiple profiles stored in the transmit controller.

The link may additionally facilitate communication between optional external modules, or accessories. One external module may be coupled to the transmit controller and another external module may be coupled to the receiver. The external modules may communicate with one another by tunneling communications via the link. The tunneled communications channel may be referred to as a "pipe." The external modules may provide, for example, temperature, acceleration, GPS, RPM, motor controller, sound, picture, or video data from the unit to the user of the transmit controller.

For identification, every transmit controller and receiver in accordance with the present invention may have a manufacturing ID. The manufacturing ID may be a unique electronic signature, or key, provided to the transmit controller or receiver when the transmit controller or receiver is manufactured. The manufacturing ID may uniquely identify the transmit controller or receiver for other transmit controllers or receivers.

Figure 1:
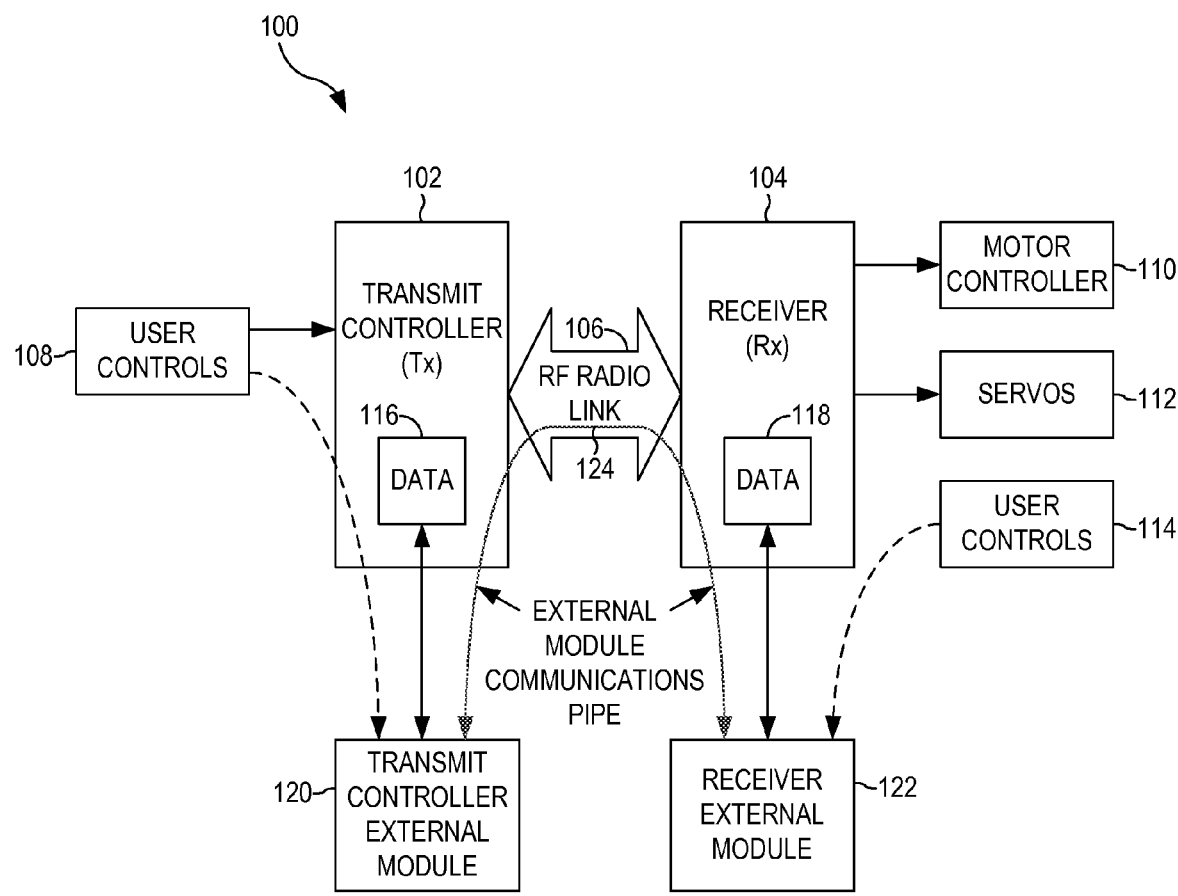
FIG. 1 depicts components of a linked transmit controller and receiver configuration in accordance with an exemplary embodiment of the present invention.

With reference to FIG. 1, depicted is a transmit controller/receiver configuration 100 in accordance with an exemplary embodiment of the present invention. Transmit controller/receiver configuration 100 may include transmit controller 102 and receiver 104. Transmit controller 102 may communicate with receiver 104 and vice versa through RF radio link 106. Transmit controller 102 may be coupled to user controls 108. Receiver 104 may be coupled to motor controller 110, servos 112, and user controls 114.

Transmit controller 102 may store data 116 and receiver 104 may store data 118. Data 116 and data 118 may include bindings, data stored when transmit controller 102 and transmit controller 104 are bound. Data 116 may include profiles stored on transmit controller 102. Data 118 may include profiles stored on receiver 104.

Transmit controller 102 may have an external module component with a connector for optional external modules such as transmit controller external module 120. Receiver 104 may have a connector for optional external modules such as receiver external module 122. Transmit controller external module 120 may be coupled to user controls 108 indirectly through transmit controller 102. Receiver external module 122 may be controlled by user controls 114, which may be coupled to receiver external module 122 indirectly through receiver 104.

Transmit controller external module 120 may communicate with receiver external module 122 and vice versa through external module communications pipe 124. External module communications pipe 124 may be a bidirectional communications channel tunneled through RF radio link 106. The communications between transmit controller external module 102 and receiver external module 122 may use a secure, proprietary protocol.

Transmit controller external module 120 and receiver external module 122 may use information from other components. This information may include information from user controls 108 and 114, such as buttons, knobs, and switches, and settings stored in data 116 or data 118. In operation, transmit controller external module 120 and receiver external module 122 may access manufacturing IDs, stored profiles, information about RF radio link 106, and other information. A special securely linked transmit controller external module 120 and a special securely linked receiver external module 122 may be used to update the firmware of transmit controller 102 and receiver 104 for upgrades. The securely linked external modules may also obtain access to the firmware of transmit controller 102 and receiver 104.

Receiver external module 122 may include sensors such as temperature, acceleration, GPS, RPM, motor controller, sound, picture, and video sensors. These sensors may collect data and provide the collected data to transmit controller external module 120 for feedback to the user. The feedback to the user may be provided, for example, by storage in a storage device, visual display on a display device, tactile feedback such as vibration, tactile display, tactile indicators, or audio feedback such as audible RPM, speed, temperature warnings, and sounds recorded by a microphone.

Receiver external module 122 may include operational devices such as lights, speakers, advanced motor control, and servo controls. These operational devices may be activated by transmit controller external module 120.

The possible external modules and external module pairs connected using RF radio link 106 may be virtually unlimited. Third parties may obtain a license to use a proprietary communications protocol used by the external modules. Third parties may provide after-market external modules that can significantly enhance the hobbyist experience.

By using user controls 108, a user may operate a unit coupled to receiver 104. Transmit controller 102 may interpret the user controls 108 and transmit the user's commands over RF radio link 106 to receiver 104. Receiver 104 may operate motor controller 110 and servos 112 in accordance with the commands. The user may additionally operate transmit controller external module 120 using user controls 108 and receiver external module 112 via user controls 114.

Figure 2:
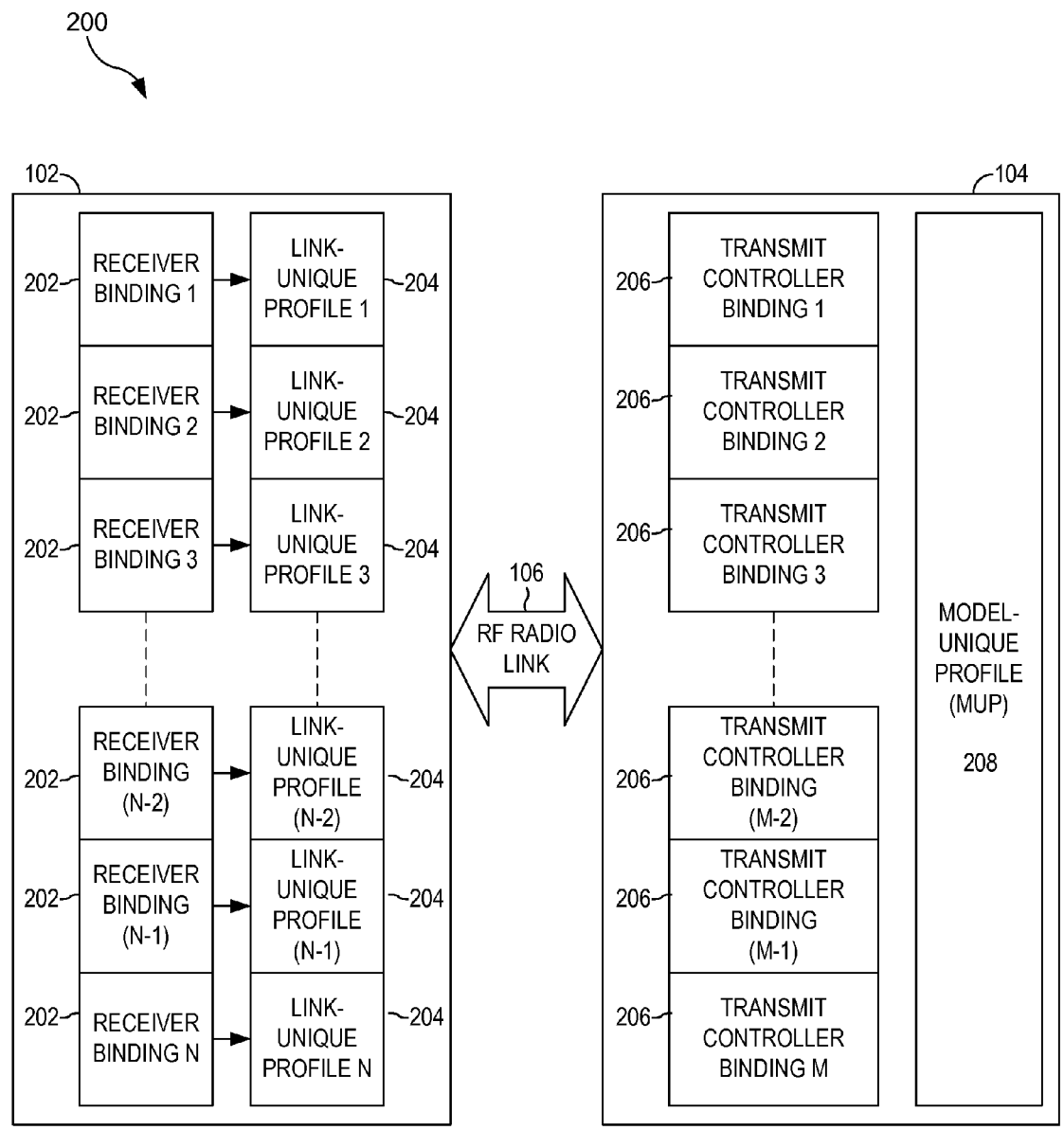
FIG. 2 depicts stored bindings and profiles in accordance with an exemplary embodiment of the present invention.

Referring to FIG. 2, depicted is a diagram 200 of binding and profile data stored on transmit controller 102 and receiver 104. Transmit controller 102 may store up to n (e.g. 20) receiver bindings 202. Each receiver binding 202 may identify a receiver by manufacturing ID. Each receiver binding 202 may also include settings for the channel, SOP, and CRC for use when linking to that receiver. Transmit controller 102 may store the order in which the receivers identified by receiver bindings 202 were most recently linked to. This order may be stored in a separate table, ordered from the most recently used binding to the least recently used binding.

Each receiver binding 202 may be associated with a link-unique profile 204. A link-unique profile 204 is a collection of parameter settings to be used in a link between transmit controller 102 and a specific receiver 104. The parameter settings may include settings for control parameters that a user may configure for the specific R/C unit of the receiver 104. For some receivers 104, transmit controller 102 may have a receiver binding 202 but no link-unique profile 204.

Receiver 104 may store up to m (e.g. 20) transmit controller bindings 206. Each transmit controller binding 206 may identify a transmit controller by manufacturing ID. Each transmit controller binding 206 may also include settings for the channel, SOP, and CRC for use when linking to that transmit controller. Receiver 104 may store the order in which the transmit controllers identified by transmit controller bindings 206 were most recently linked to. This order may be stored in a separate table, ordered from the most recently used binding to the least recently used binding.

Receiver 104 may also store a model-unique profile 208. A model-unique profile 208 may be a generic set of driving parameter settings or a specific driver profile designed by the manufacturer of the unit receiver 104 is installed in to optimize the driving experience for the model of the unit. Model-unique profile 208 may include, among other parameter settings, factory default settings, customized fail safe settings, and motor controller control parameter settings. A maintenance feature may be provided to allow a user to reset the link-unique profile 204 of the currently linked receiver 104 to the model-unique profile 208.

If the number of receiver bindings 202 in transmit controller 102 reaches the maximum number n or the number of transmit controller bindings 206 in receiver 104 reaches the maximum number m, transmit controller 102 or receiver 104 may be unable to add a new binding 202 or 206 without replacing an existing binding 202 or 206. In this situation, transmit controller 102 or receiver 104 may ordinarily replace the least recently used binding 202 or 206. When a receiver binding 202 is replaced, transmit controller 102 may also replace the associated link-unique profile 204.

If a user desires to keep a binding 202 or 206 from being replaced, the user may "lock" that binding 202 or 206. Transmit controller 102 or receiver 104 may ignore locked bindings 202 or 206 in determining the least recently used binding 202 or 206. Therefore, a new binding 202 or 206 may replace the least recently used unlocked binding 202 or 206.

To link transmit controller 102 to a previously bound receiver 104, a user may simply power up both transmit controller 102 and receiver 104 within a pre-determined time (e.g. 10 seconds). The user may power up transmit controller 102 and receiver 104 in any order. Transmit controller 102 may have a receiver binding 202 for the receiver 104 and the receiver 104 may have a transmit controller binding 206 for the transmit controller 104. Transmit controller 102 and receiver 104 may mutually discover that they have bindings 202 and 206 for each other and automatically link. Thus, the unit may automatically, almost instantaneously be under full control of the user when the user powers up the previously bound transmit controller 102 and receiver 104.

The linking process may be performed as follows. First, receiver 104 may broadcast a link request signal containing its manufacturing ID. Transmit controller 102 may receive the link request signal and determine from the receiver 104 manufacturing ID if transmit controller 102 is bound to receiver 104. If transmit controller 102 is not bound to receiver 104, transmit controller 102 may not respond to the link request signal and may continue listening for a link request signal.

If transmit controller 102 is bound to receiver 104, transmit controller 102 may respond with a link response signal containing its manufacturing ID. Receiver 104 may receive the link response signal and determine from the transmit controller 102 manufacturing ID if receiver 104 is bound to transmit controller 102. If receiver 104 is not bound to transmit controller 102, receiver 104 may not respond to the link response signal and may continue broadcasting the link request signal.

If receiver 104 is bound to transmit controller 102, receiver 104 may respond to the link response signal by transmitting a link acknowledge signal. After receiver 104 transmits the link acknowledge signal and transmit controller 102 receives the link acknowledge signal, transmit controller 102 and receiver 104 are linked and transmit controller 102 may transmit commands to receiver 104.

The linking process may be varied to give transmit controller 102 a preference for linking with the receiver 104 it last linked with or bound to, and to give receiver 104 a preference for linking with the transmit controller 102 it last linked with or bound to. Transmit controller 102 may determine it has a valid last used binding and transmit a PWM (Pulse Width Modulation) packet to the receiver 104 associated with that binding prior to waiting for a link request. Receiver 104 may determine it has a valid last used binding and wait for a PWM packet from the transmit controller 102 associated with that binding prior to transmitting a link request. If receiver 104 receives the PWM packet, receiver 104 may transmit a link acknowledge signal. After transmitting the PWM packet, transmit controller 102 may wait for a link acknowledge signal from the corresponding receiver 104 in addition to waiting for a link request signal. If transmit controller 102 receives the link acknowledge signal from receiver 104, transmit controller 102 and receiver 104 are linked and transmit controller 102 may transmit commands to receiver 104.

To communicate, a transmit controller 102 and receiver 104 may need to agree on a channel, SOP (Start Of Packet code), and CRC (Cyclic Redundancy Check). For binding, a channel, SOP, and CRC may be predefined and dedicated. Similarly, a channel, SOP, and CRC may be predefined and dedicated for transmitting and receiving a link request and transmitting and receiving a link response. For subsequent communications for a transmit controller and receiver that have not been linked since being bound, the receiver may transmit the SOP as part of the link request. The transmit controller may select an appropriate channel and send it during the link response. The CRC for both sides may be formed by combining the manufacturing ID of the transmit controller and the manufacturing ID of the receiver. Once a channel, SOP, and CRC are known for a given transmit controller-receiver pair, the channel, SOP, and CRC may be stored as part of the respective bindings on each side. When the transmit controller and receiver next link, these values, taken from the bindings, may be used automatically.

Transmit controller 102 may determine that multiple receivers 104 for which transmit controller 102 has receiver bindings 202 are available for linking. In this case, transmit controller 102 may bind to the receiver 104 which first becomes available for linking. This situation may arise when multiple receivers 104 are powered on at the same time, for instance. Binding to the receiver 104 which was first available may result in a unique linking of exactly one transmit controller 102 to exactly one receiver 104.

Similarly, receiver 104 may determine that multiple transmit controllers 102 for which receiver 104 has transmit controller bindings 206 are available for linking. In this case, receiver 104 may bind to the transmit controller 102 which first becomes available for linking This situation may arise when multiple transmit controllers 102 are powered on at the same time, for instance. Again, binding to the transmit controller 102 which was first available may result in a unique linking of exactly one transmit controller 102 to exactly one receiver 104.

If transmit controller 102 has a link-unique profile 204 associated with the receiver binding 202 for the receiver 104, transmit controller 102 may automatically use this profile upon establishing the link 106. As an example, "Dad," an experienced user, and "Junior," an inexperienced user, may have separate transmit controllers 102 but share a single unit 204. The unit 204 may have a high performance mode for experienced users and a training mode for inexperienced users.

Dad may set the unit to the high performance mode while operating the unit. Dad's transmit controller 102 may associate the receiver binding 202 for the unit's receiver 104 with a link-unique profile 204 for high performance mode. The next time Dad links Dad's transmit controller 102 with the unit, the transmit controller 102 may automatically use high performance mode. Similarly, Junior may set the unit to the training mode while operating the unit. Junior's transmit controller 102 may associate the receiver binding 202 for the unit's receiver with a link-unique profile 204 for training mode. The next time Junior links Junior's transmit controller 102 with the unit, the transmit controller 102 may automatically use training mode.

Each link-unique profile 204 may be associated with a specific receiver binding 202. Therefore, if Dad and Junior use their transmit controllers to operate other units and modify profiles for those units, the link-unique profiles associated with the first unit may be unchanged. Dad's transmit controller 102 may always automatically use high performance mode and Junior's transmit controller 102 may always automatically use training mode regardless of whether the transmit controllers have been used to operate other units.

This example can be extended to more than two transmit controllers 102 ("Dad's," "Junior's," "Sissie's," "Mom's," "Uncle's," and so on) associated with a single unit. When any of the transmit controllers 102 are powered up, the link-unique profile 204 of that transmit controller 102 for the unit's receiver 104 may be loaded and operational. If multiple transmit controllers 102 are powered up at approximately the same time, the receiver 104 may link to the transmit controllers 102 in the order they were powered up.

A transmit controller and receiver in accordance with an exemplary embodiment of the present invention may provide a completely automated linking process that is transparent to the user. A user may first bind the transmit controller to the receiver using conventional methods. In accordance with the present invention, the transmit controller may create a receiver binding for the receiver and associate the binding with a profile for the receiver. The receiver may create a binding for the transmit controller. Then the user may simply turn on the power to the transmit controller, then turn on the power to the receiver. The user may almost immediately operate the unit with a profile previously saved on the transmit controller which is unique to that receiver.

Figure 3:
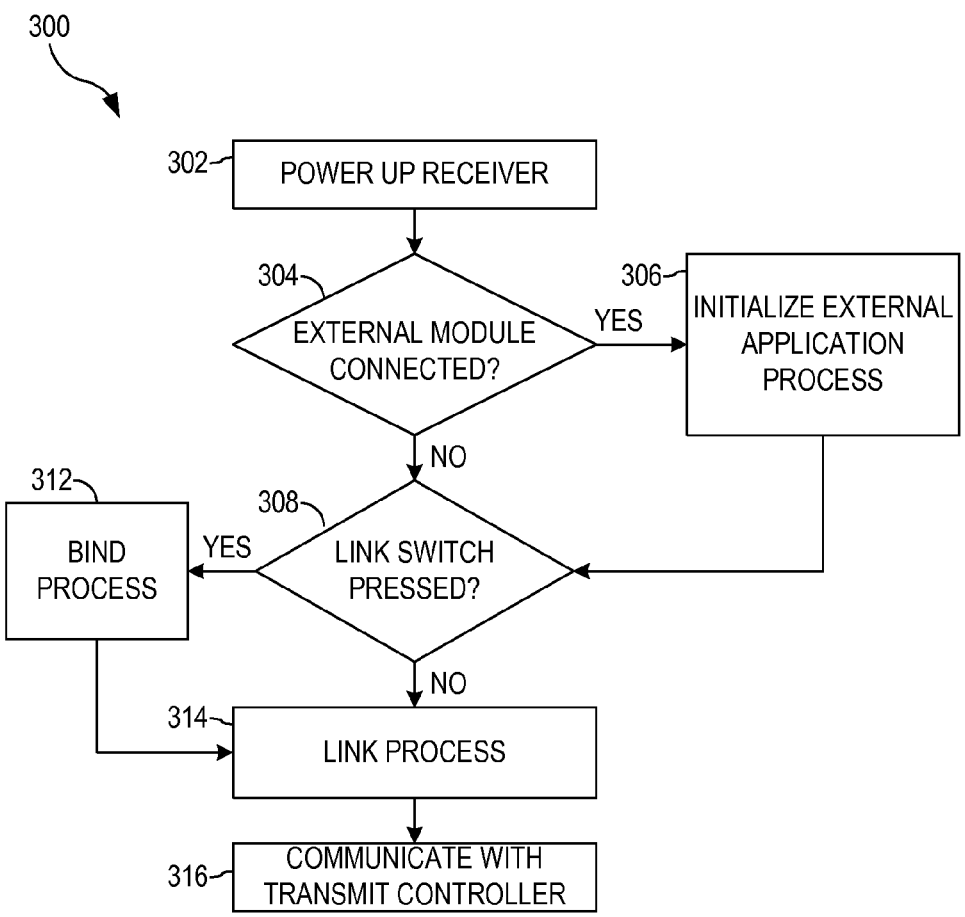
FIG. 3 depicts the main process performed by the receiver in accordance with an exemplary embodiment of the present invention.

Referring to FIG. 3, depicted is a process 300 for the operation of a receiver in accordance with an exemplary embodiment of the present invention. Process 300 may begin when the receiver is powered up at step 302.

From step 302, the process 300 may continue to step 304, where it may be determined if an external module is connected to the receiver. If an external module is connected, the process 300 may continue to step 306, where an external application process for the connected external module may be initialized. If an external module is not connected or after step 306, the process 300 may continue to step 308.

At step 308, it may be determined if a link switch on the receiver is pressed. The link switch may allow the user to determine whether the receiver should bind to an available transmit controller. If the link switch is pressed, the process 300 may continue to step 312, where the receiver may bind to an available transmit controller. Step 312 is described in more detail with reference to FIG. 4.

After the receiver binds with a transmit controller in step 312 or if the link switch is not pressed at step 308, the process 300 may continue to step 314. At step 314, the receiver may link to a previously bound transmit controller. Step 314 is described in more detail with reference to FIG. 5. After step 314, the receiver may communicate with the transmit controller at step 316.

Figure 4:
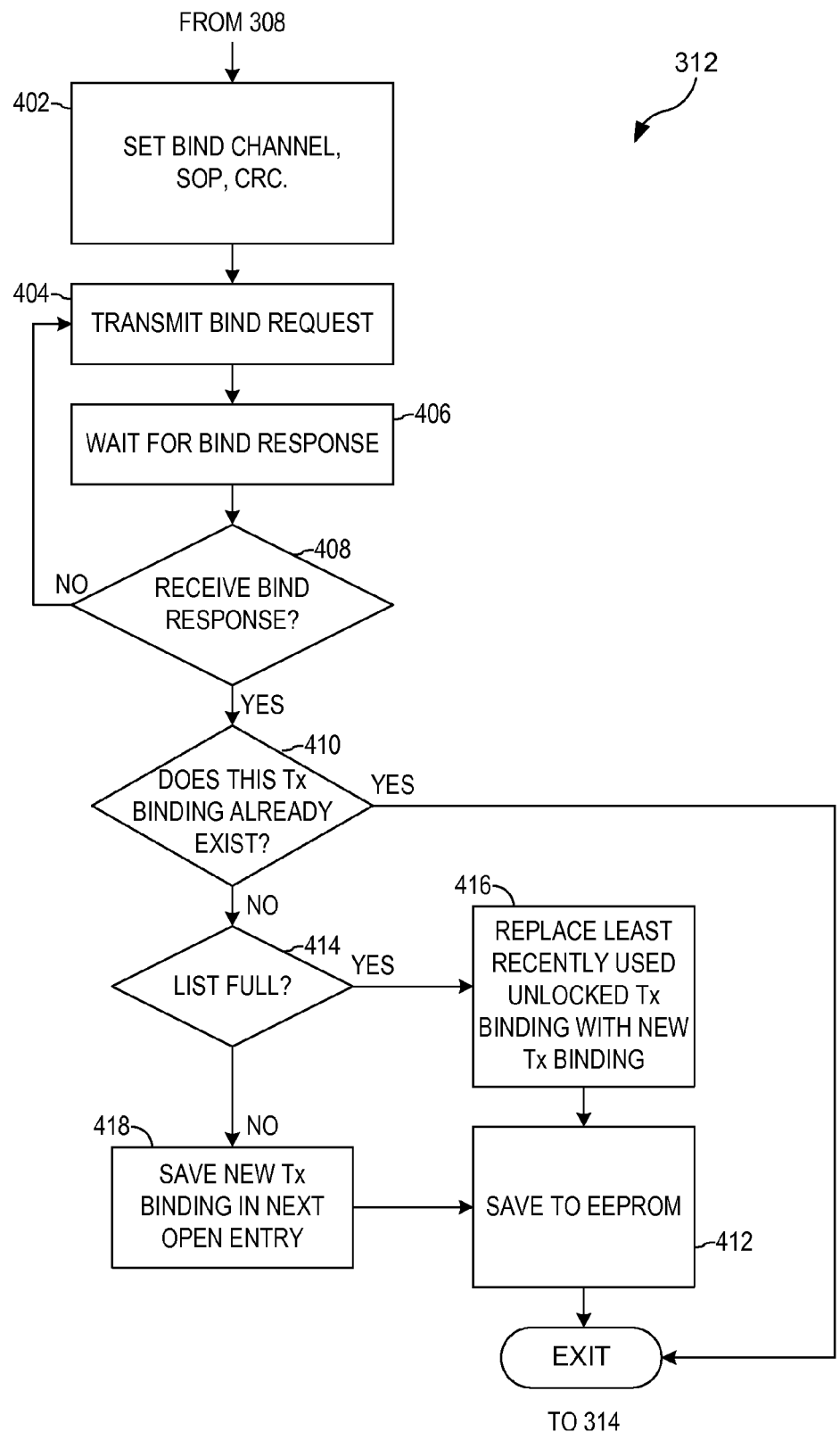
FIG. 4 depicts the receiver bind process of FIG. 3 in accordance with an exemplary embodiment of the present invention.

Referring to FIG. 4, depicted is step 312 of process 300 in greater detail. Step 312 may begin at step 402. At step 402, the link channel, SOP, and CRC may be set to designated values for binding with a transmit controller.

At step 404, the receiver may transmit a bind request for a certain amount of time, such as 5 ms. This may be done by setting a Bind Cycle Timer to expire in 5 ms and transmitting the bind request until the Bind Cycle Timer expires. At step 406, the receiver may wait for a response to the bind request for a certain amount of time, such as 5 ms. This may be done by setting a Bind Cycle Timer to expire in 5 ms and waiting until a bind response is received or the Bind Cycle Timer expires.

At step 408, it may be determined if the receiver received a bind response in step 406. If the receiver received a bind response, step 312 may continue to step 410. If the receiver did not receive a bind response, step 312 may return to step 404.

At step 410, it may be determined if the receiver already has a transmit controller binding for the transmit controller which transmitted the bind response. This determination may be made by comparing a manufacturing ID included in the bind response with manufacturing IDs in each transmit controller binding. If a transmit controller binding does not already exist for the transmit controller, a new transmit controller binding should be saved. Step 312 may continue to step 414. If the transmit controller already has a receiver binding for the receiver, the transmit controller may be considered already bound to the receiver and step 612 may terminate.

At step 412, the new transmit controller binding may be saved to the receiver EEPROM. After step 412, step 312 may terminate.

At step 414, it may be determined if the list of transmit controller bindings in the receiver is full. If the list is full, at step 416 the least recently used unlocked transmit controller binding may be replaced with a new transmit controller binding for the transmit controller that transmitted the bind response. If the list is not full, a new transmit controller binding for the transmit controller that transmitted the bind response may be saved in the next open entry in the list at step 418. After the new transmit controller binding is saved in step 416 or step 418, step 312 may continue to step 412.

Figure 5:
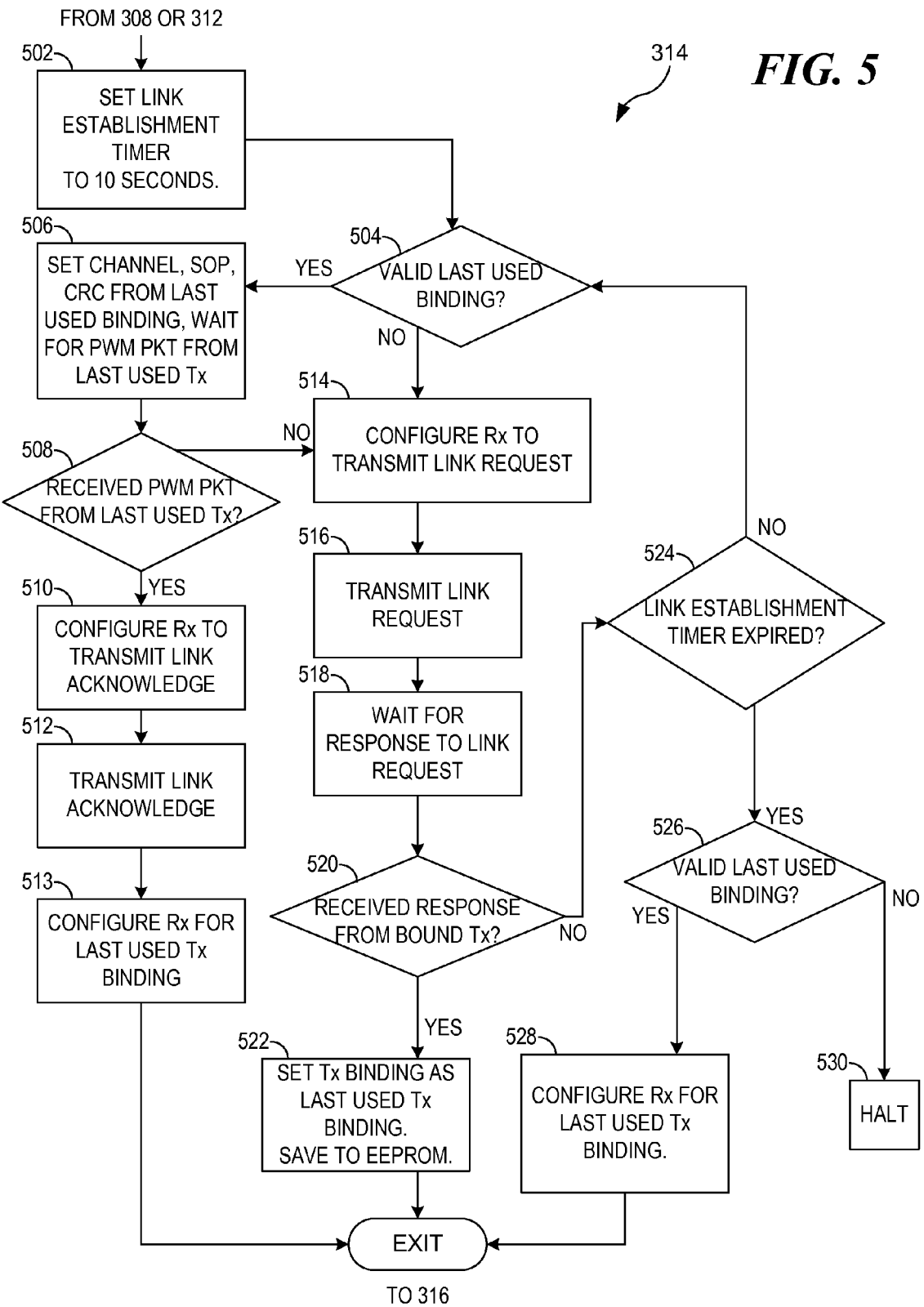
FIG. 5 depicts the receiver link process of FIG. 3 in accordance with an exemplary embodiment of the present invention.

Referring to FIG. 5, depicted is step 314 of process 300 in greater detail. Step 314 may begin at step 502. At step 502, a Link Establishment Timer may be set to expire in 10 seconds. The receiver may be expected to link to a transmit controller within this time. After step 502, step 314 may continue to step 504.

At step 504, it may be determined if the receiver has a valid last used (most recently used) transmit controller binding. The last used transmit controller binding may identify the transmit controller that the receiver was last linked to or bound to. If the receiver has a valid last used transmit controller binding, step 314 may continue to step 506.

At step 506, the receiver may set the channel, SOP, and CRC to values in the last used transmit controller binding. After the receiver is configured, the receiver may wait for a certain amount of time, such as 5 ms, for a PWM packet from that transmit controller. This may be done by setting a Link Cycle Timer to expire in 5 ms and waiting until a PWM packet is received from the transmit controller or the Link Cycle Timer expires. Any signals from other transmit controllers may be ignored. The transmit controller which sent a PWM packet may be identified by its manufacturing ID in the request.

At step 508, it may be determined if a link request from the transmit controller identified by the last used transmit controller binding was received in step 506. If such a link request was received, step 314 may continue to step 510.

At step 510, the receiver may be configured to transmit a link acknowledgement in response to the PWM packet. This configuration may be done by setting the channel, SOP, and CRC to values in the link request.

At step 512, the receiver may transmit an acknowledgement of the link request to the transmit controller for a certain amount of time. This may be done by setting a Link Cycle Timer to expire in 5 ms and transmitting the acknowledgement until the Link Cycle Timer expires. In step 513, The receiver may then be configured to communicate with the transmit controller identified by the last used transmit controller binding. This configuration may be done by setting the channel, SOP, and CRC to values in the last used transmit controller binding. After step 513, step 314 may terminate. The receiver may be considered linked to the transmit controller with the last used transmit controller binding.

If it is determined the receiver does not have a valid last used transmit controller binding at step 504 or no link request is received from the transmit controller identified by that binding at step 506, step 314 may continue to step 514. At step 514, the receiver may be configured to transmit a link request. The configuration may be done by setting the channel, SOP, and CRC to values corresponding to transmitting a link request. After the receiver is configured, the receiver may transmit a link request for a certain amount of time, such as 5 ms. This may be done by setting a Link Cycle Timer to expire in 5 ms and transmitting a link request until the Link Cycle Timer expires. At step 516, the receiver may transmit the link request.

At step 518, the receiver may wait for a certain amount of time, such as 5 ms, for a response to the link request transmitted in step 514 from a bound transmit controller. This may be done by setting a Link Cycle Timer to expire in 5 ms and waiting until a response to the link request is received from a bound transmit controller or the Link Cycle Timer expires. Any responses from unbound transmit controllers may be ignored. Whether a response is from a bound transmit controller may be determined by comparing the manufacturing ID in the request with the manufacturing ID in each transmit controller binding.

At step 520, it may be determined if a response was received from a bound transmit controller. If a response was received, at step 522 the transmit controller binding of the transmit controller that sent the response may be set as the last used transmit controller binding. The last used transmit controller binding may be saved to the receiver EEPROM. After step 522, Step 314 may terminate. The receiver may be considered linked to the transmit controller that sent the response.

If it is determined in step 520 that no response was received from a bound transmit controller, step 314 may continue to step 524. At step 524, it may be determined if the Link Establishment Timer set in step 502 has expired. If the Link Establishment Timer has not expired, step 314 may return to step 504.

If the Link Establishment Timer has expired, step 314 may continue to step 526. In step 526, it may be determined if the receiver has a valid last used transmit controller binding. If no such binding exists, it may be determined no link can be established. Step 314 may continue to step 530, where the process 300 may halt.

If it is determined in step 526 the receiver has a valid last used transmit controller binding, step 314 may continue to step 528. In step 528, the receiver may be configured to establish a link to the transmit controller with the last used transmit controller binding. This configuration may be done by setting the channel, SOP, and CRC to values saved in the last used transmit controller binding. After step 528, step 314 may terminate. The receiver may be considered linked to the last used transmit controller by default.

Figure 6:
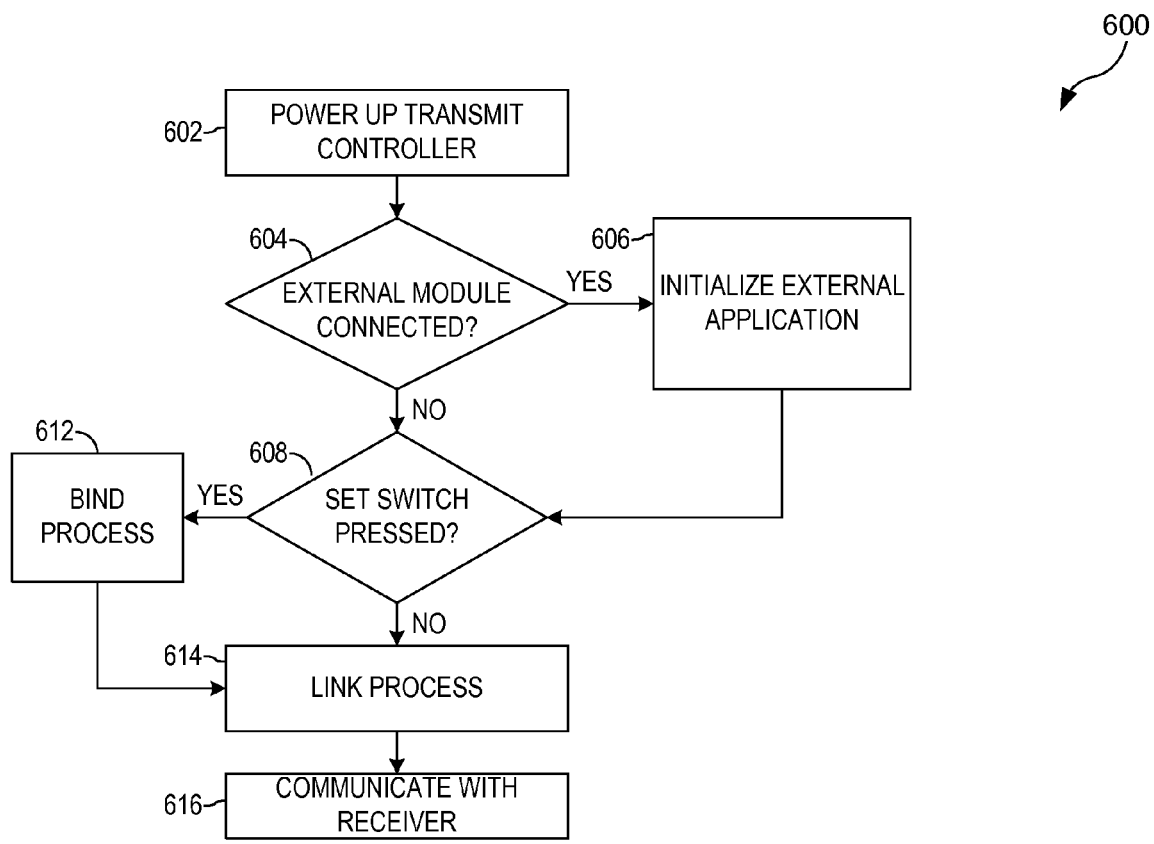
FIG. 6 depicts the main process performed by the transmit controller in accordance with an exemplary embodiment of the present invention.

Referring to FIG. 6, depicted is a process 600 for the operation of a transmit controller in accordance with an exemplary embodiment of the present invention. Process 600 may begin when the transmit controller is powered up at step 602.

From step 602, the process 600 may continue to step 604, where it may be determined if an external module is connected to the transmit controller. If an external module is connected, the process 600 may continue to step 606, where an external application process for the connected external module may be initialized. If an external module is not connected or after step 606, the process 600 may continue to step 608.

At step 608, it may be determined if a set switch on the transmit controller is pressed. The set switch may allow the user to determine whether the transmit controller should bind to an available receiver. If the set switch is pressed, the process 600 may continue to step 612, where the transmit controller may bind to an available receiver. Step 612 is described in more detail with reference to FIG. 7.

After the transmit controller binds to a receiver in step 612, or if the set switch is not pressed at step 608, the process 600 may continue to step 614. At step 614, the transmit controller may link to a previously bound receiver. Step 614 is described in more detail with reference to FIG. 8. After step 614, the transmit controller may communicate with the receiver at step 616.

Figure 7:
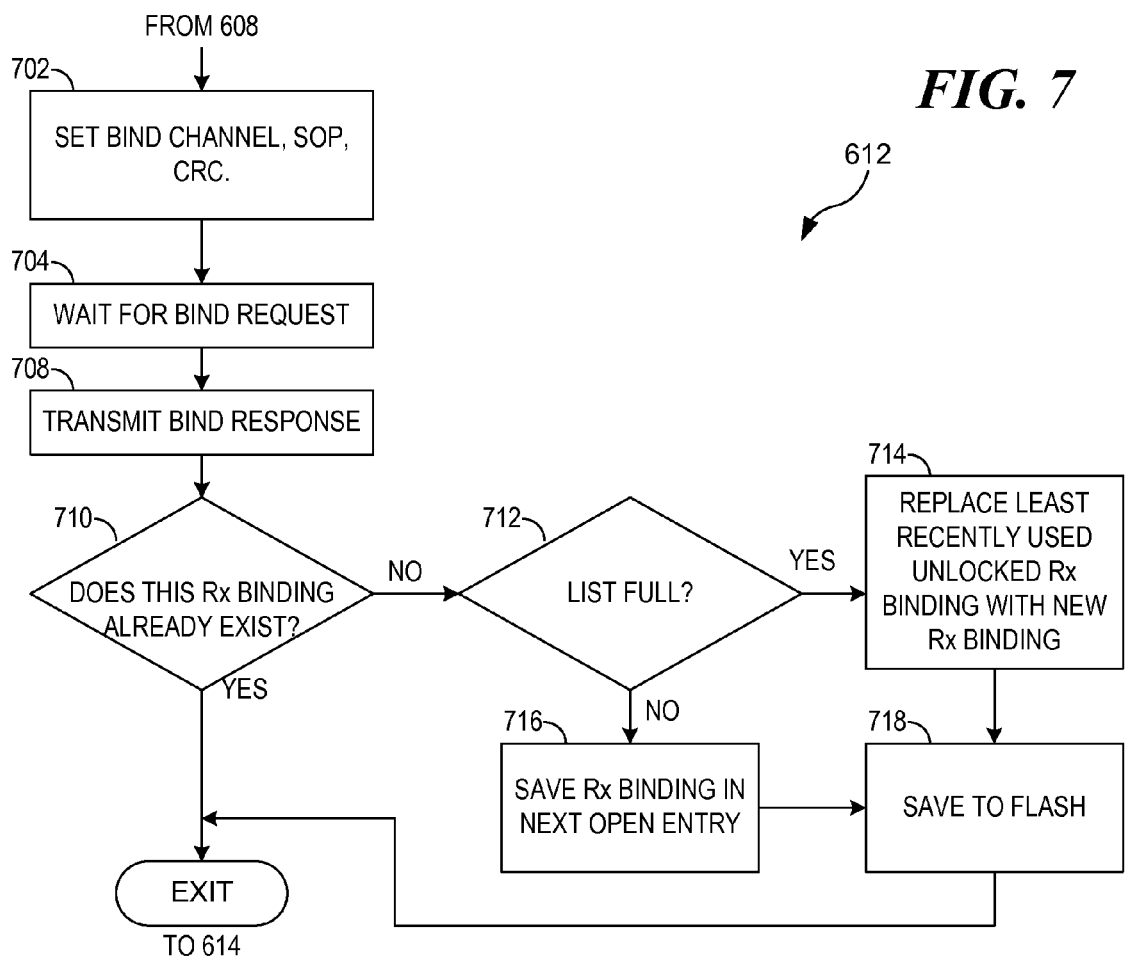
FIG. 7 depicts the transmit controller bind process of FIG. 6 in accordance with an exemplary embodiment of the present invention.

Referring to FIG. 7, depicted is step 612 of process 600 in greater detail. Step 612 may begin at step 702. At step 702, the bind channel, SOP, and CRC may be set to designated values for binding with a receiver. At step 704, the transmit controller may wait for a bind request from a receiver.

At step 708, the transmit controller may transmit a bind response to the bind request for a certain amount of time, such as 5 ms. This may be done by setting a Bind Cycle Timer to expire in 5 ms and transmitting the bind response until the Bind Cycle Timer expires.

At step 710, it may be determined if the transmit controller already has a receiver binding for the receiver which transmitted the bind request in step 704. This determination may be made by comparing a manufacturing ID included in the bind request with manufacturing IDs in each receiver binding. If the transmit controller already has a receiver binding for the receiver, the transmit controller may be considered already bound to the receiver and step 612 may terminate.

If a receiver binding does not already exist for the receiver, a new receiver binding should be saved for the receiver. Step 612 may continue to step 712. At step 712, it may be determined if the list of receiver bindings in the transmit controller is full. If the list is full, at step 714 the least recently used unlocked receiver binding may be replaced with a new receiver binding for the receiver that transmitted the bind request. If the list is not full, at step 716 a new receiver binding for the receiver that transmitted the bind request may be saved in the next open entry in the list. After the new transmit controller binding is saved in step 714 or step 716, step 612 may continue to step 718.

At step 718, the new receiver binding may be saved to the transmit controller FLASH memory. After step 718, step 612 may terminate. The transmit controller may be considered bound to the receiver that transmitted the bind response.

Figure 8:
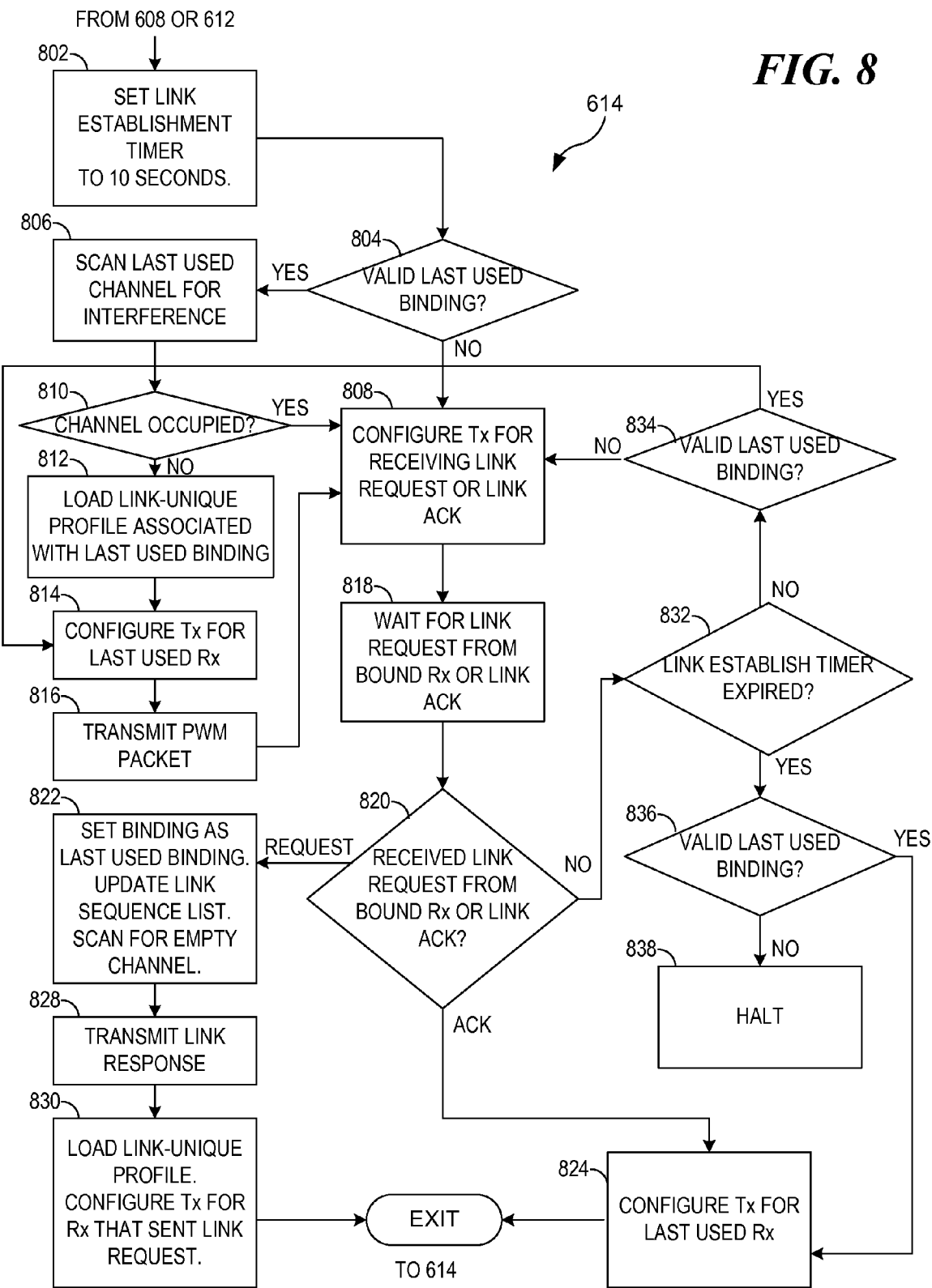
FIG. 8 depicts the transmit controller link process of FIG. 6 in accordance with an exemplary embodiment of the present invention.

Referring to FIG. 8, depicted is step 614 of process 600 in greater detail. Step 614 may begin at step 802. At step 802, a Link Establishment Timer may be set to expire in 10 seconds.

The transmit controller may be expected to link to a receiver within this time. After step 802, step 614 may continue to step 804.

At step 804, it may be determined if the transmit controller has a valid last used (most recently used) receiver binding. The last used receiver binding may identify the receiver that the transmit controller was last linked to or bound to. If the transmit controller has a valid last used receiver binding, step 614 may continue to step 806. If the transmit controller does not have a valid last used receiver binding, step 614 may continue to step 808.

At step 806, the transmit controller may scan the last used channel for interference. At step 810 it may be determined if the last used channel is occupied. If the last used channel is not occupied, step 614 may continue to step 812. If the last used channel is occupied, step 614 may continue to step 808.

At step 812, the transmit controller may load the link-unique profile associated with the last used transmit controller binding. At step 814, the transmit controller may be configured to establish a link to the receiver with the last used transmit controller binding. This configuration may be done by setting the channel, SOP, and CRC to values saved in the last used transmit controller binding.

At step 816, the transmit controller may transmit a PWM packet to the receiver identified by the last used transmit controller binding for a certain amount of time, such as 5 ms. This may be done by setting a Link Cycle Timer to expire in 5 ms and transmitting the PWM packet until the Link Cycle Timer expires. The PWM packet may contain the manufacturing ID of the intended recipient to identify the intended recipient. After the PWM packet is transmitted, step 614 may continue to step 808.

At step 808, the transmit controller may be configured to establish a link to any bound receiver. This configuration may be done by setting the channel, SOP, and CRC to values corresponding to establishing a link to any bound receiver.

At step 818, the transmit controller may wait for a certain amount of time, such as 5 ms, for a link request from a bound receiver or an acknowledgement of the link request, if any, transmitted at step 816. This may be done by setting a Link Cycle Timer to expire in 5 ms and waiting until a link request from a bound receiver is received, an acknowledgement is received, or the Link Cycle Timer expires.

Any link requests from unbound receivers may be ignored. The receiver which sent a link request may be identified by a manufacturing ID in the request. The manufacturing ID may be compared with manufacturing IDs in each receiver binding to determine if the receiver is bound to the transmit controller. When the transmit controller receives either a link request from a bound receiver or an acknowledgement, or if a certain amount of time expires, step 614 may continue to step 820.

At step 820, it may be determined if the transmit controller received a link request from a bound receiver or an acknowledgement of any link request transmitted at step 818. If the transmit controller received a link request from a bound receiver, step 614 may continue to step 822. If the transmit controller received a link acknowledgement, step 614 may continue to step 824. If the transmit controller received neither a link request from a bound receiver nor a link acknowledgment, step 614 may continue to step 826.

At step 822, the receiver binding for the receiver which sent the link request may be set as the last used receiver binding. The last used receiver binding may be saved to the transmit controller EEPROM. The transmit controller may scan for an empty channel to use to communicate with the receiver.

At step 828, the transmit controller may transmit a link response to the receiver that sent the link request for a certain amount of time, such as 5 ms. This may be done by setting a Link Cycle Timer to expire in 5 ms and transmitting the link response until the Link Cycle Timer expires.

At step 830, the transmit controller may load the link-unique profile associated with the last used transmit controller binding. The transmit controller may be configured to establish a link with the receiver that sent the link request. This configuration may be done by setting the channel, SOP, and CRC to values in the receiver binding for the receiver that sent the link request. After step 830, step 614 may terminate. The transmit controller may be considered linked to the receiver that sent the link request.

At step 824, the transmit controller may be configured to establish a link to the receiver identified by the last used receiver binding. This configuration may be done by setting the channel, SOP, and CRC to values in the last used receiver binding. After step 824, step 614 may terminate. The transmit controller may be considered linked to the receiver identified by the last used receiver binding.

At step 832, the transmit controller may determine if the link establish timer set in step 802 has expired. If the link establish timer has not expired, step 614 may continue to step 834. If the link establish timer has expired, step 614 may continue to step 836.

At step 834, it may be determined if the transmit controller has a valid last used transmit controller binding. If the transmit controller has a valid last used transmit controller binding, step 614 may continue to step 814. If the transmit controller does not have valid a last used transmit controller binding, step 614 may continue to step 808.

At step 836, it may be determined if the transmit controller has a valid last used transmit controller binding. If the transmit controller does not have a valid last used transmit controller binding, it may be determined no link can be established. Step 614 may continue to step 838, where the process 600 may halt.

If it is determined in step 836 the transmit controller has a valid last used receiver binding, it may be determined that the transmit controller should be linked to the receiver identified by the last used receiver binding by default. Step 830 may continue to step 824.

Figure 9:
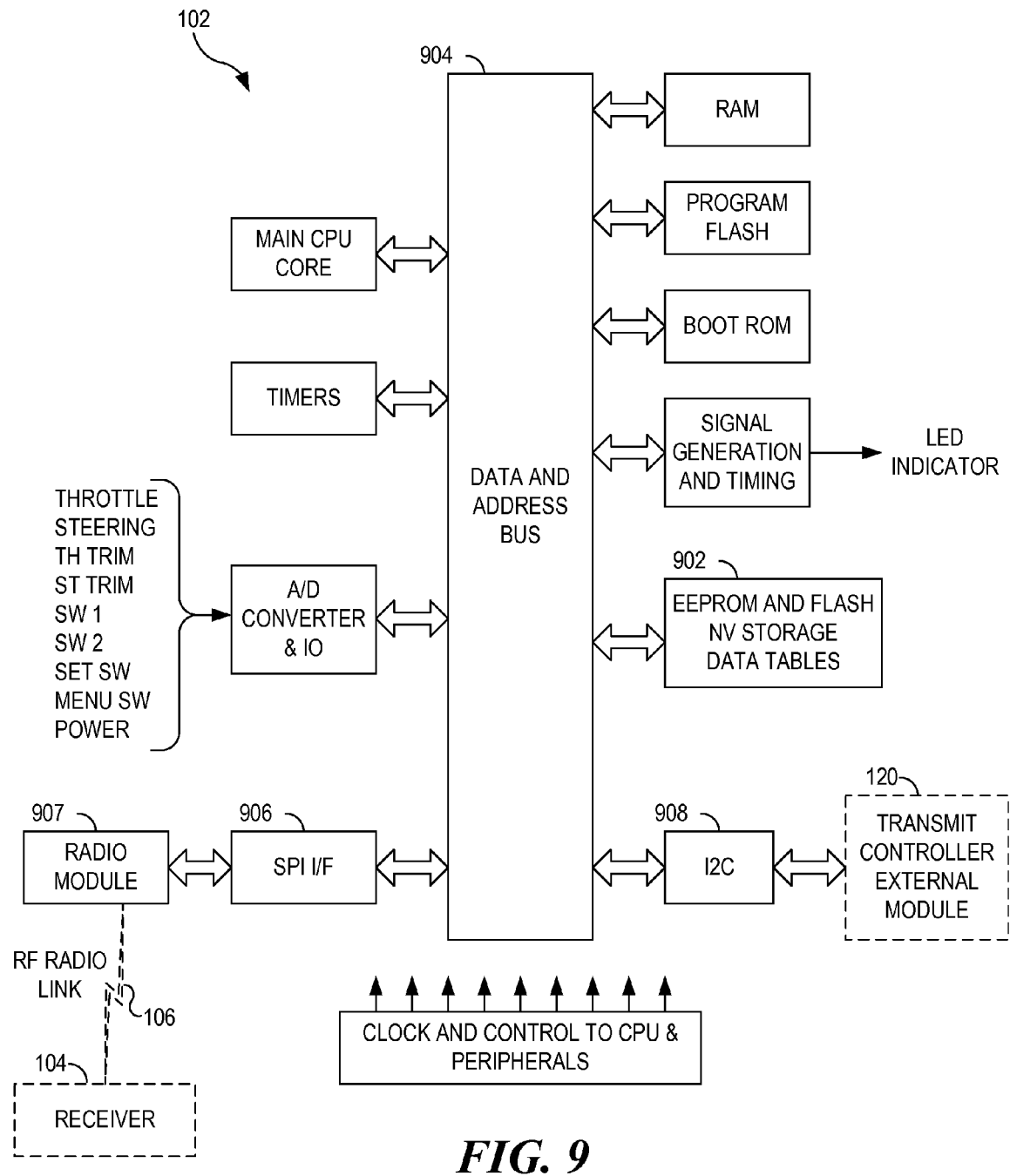
FIG. 9 depicts hardware components of a transmit controller in accordance with an exemplary embodiment of the present invention.

Referring to FIG. 9, depicted is a block diagram of hardware components of a transmit controller 102 in accordance with an exemplary embodiment of the present invention. Many components of transmit controller 102 may be conventional components known in the art.

Transmit controller 102 may have EEPROM and FLASH nonvolatile storage data tables 902. Data tables 902 may be accessible via data and address bus 904. Data tables 902 may contain receiver bindings 202 and link-unique profiles 204 in FIG. 2. Because EEPROM has more write cycles than FLASH memory, EEPROM may store the last used receiver binding 202 while FLASH memory may store all other receiver bindings. Serial Peripheral Interface (SPI I/F) 906 may provide an interface to receiver 104 through radio module 907 and RF radio link 106. Inter-Integrated Circuit (I2C) 908 may provide an interface to a connected transmit controller external module 120. Receiver 104, RF radio link 106, and transmit controller external module 120 are shown in dashed lines because they are not components of transmit controller 102.

Figure 10:
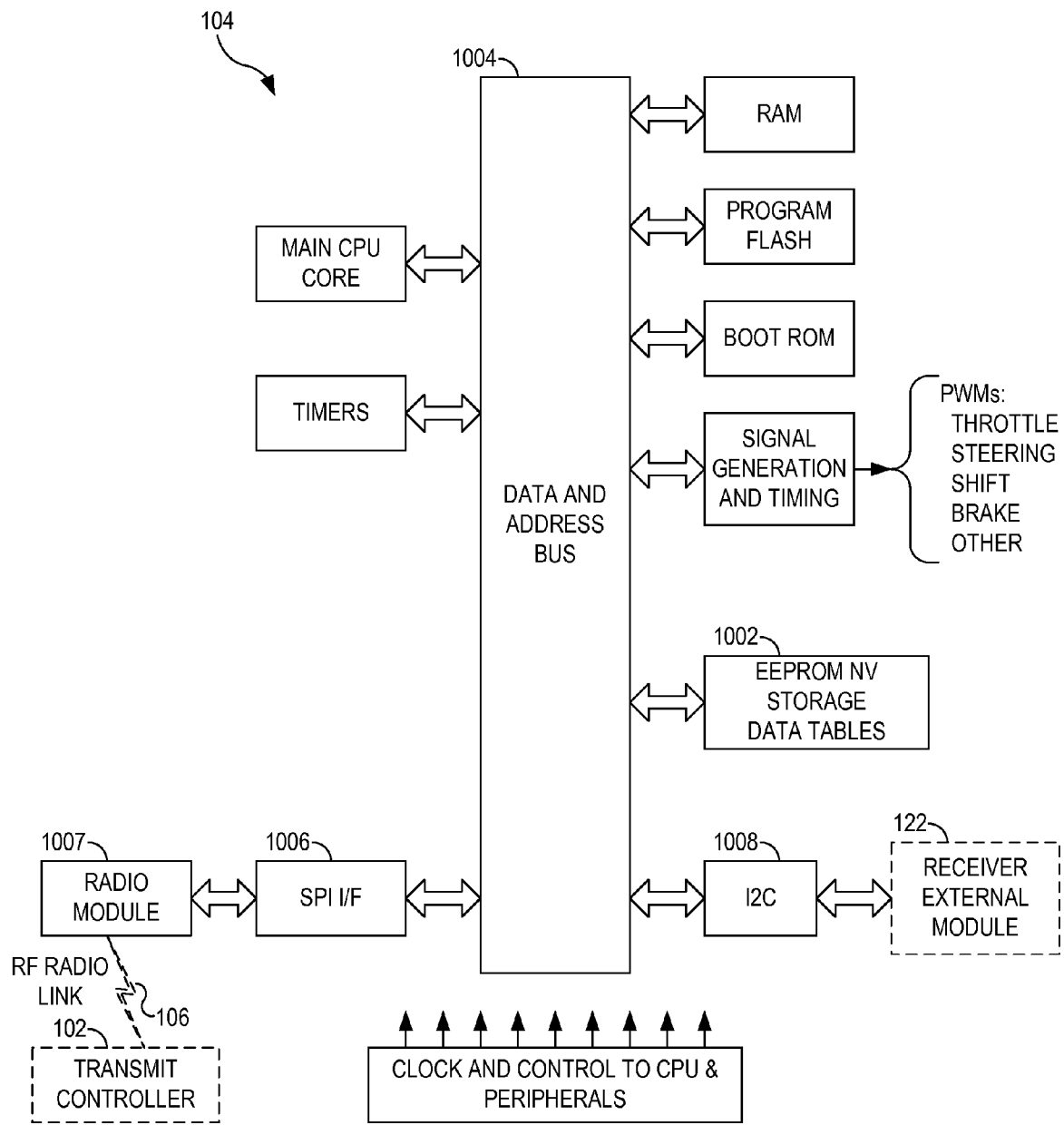
FIG. 10 depicts hardware components of a receiver in accordance with an exemplary embodiment of the present invention.

Referring to FIG. 10, depicted is a block diagram of hardware components of a receiver 104 in accordance with an exemplary embodiment of the present invention. Many components of receiver 104 may be conventional components known in the art.

Receiver 104 may have EEPROM nonvolatile storage data tables 1002. Data tables 1002 may be accessible via data and address bus 1004. Data tables 1002 may contain transmit controller bindings 206 and model-unique profile 208 in FIG. 2. Flash storage 1003, rather than data tables 1002, may contain the most recently used transmit controller binding 206, so that the last used transmit controller binding 206 may be accessed more quickly. Serial Peripheral Interface (SPI I/F) 1006 may provide an interface to transmit controller 102 through radio module 1007 and RF radio link 106. Inter-Integrated Circuit (I2C) 1008 may provide an interface to a connected receiver external module 122. Transmit controller 102, RF radio link 106, and receiver external module 122 are shown in dashed lines because they are not components of receiver 104.

The present invention may provide intuitive ease of use in linking transmit controllers and receivers. A user may realize a significant advantage in being able to automatically link transmit controllers and receivers in a many to many configuration. Any one of a number of users, each with an individual transmit controller, may select any of a number of units, power up the user's transmit controller and the unit, and begin operating the unit. Auto-link exclusion may guarantee that no other bound user can interfere with the unit. The user may conveniently link the transmit controller to the unit without having to navigate screens or menus to find the right profile or model.

Although the invention has been described with reference to a specific embodiment, these descriptions are not meant to be construed in a limiting sense. Various modifications of the disclosed embodiments, as well as alternative embodiments of the invention will become apparent to persons skilled in the art upon reference to the description of the invention. It is therefore contemplated that the claims will cover any such modifications or embodiments that fall within the true scope and spirit of the invention.

The invention claimed is:

1. A method for a model vehicle radio control transmit controller communicating with exactly one model vehicle radio control receiver comprising:
   storing a plurality of identifiers in a model vehicle radio control transmit controller, each identifier comprising an identifier of a model vehicle radio control receiver;
   the model vehicle transmit controller receiving a link request from a first model vehicle radio control receiver, the link request comprising an identifier of the first model vehicle receiver;
   the model vehicle transmit controller determining the identifier of the first model vehicle receiver is stored in the plurality of identifiers;
   in response to the model vehicle transmit controller determining the identifier of the first model vehicle receiver is stored in the plurality of identifiers:
      the model vehicle transmit controller transmitting a link response to the first model vehicle receiver;
      the model vehicle transmit controller identifying a radio channel for communication with the first model vehicle receiver; and
      the model vehicle transmit controller storing the radio channel as a last used radio channel;
   in response to a powering on of the model vehicle transmit controller subsequent to the storing of the radio channel:
      the model vehicle transmit controller transmitting a control instruction on the last used radio channel, the control instruction controlling the motion of a model vehicle; and
      the model vehicle transmit controller receiving a link acknowledge signal from the first model vehicle radio control receiver.

2. The method of claim 1, wherein the link response causes the model vehicle transmit controller to establish a communications link with the first model vehicle receiver, and further comprising the model vehicle transmit controller not responding to signals from any model vehicle receiver other than the first model vehicle receiver while the communications link exists.

3. The method of claim 1, wherein the control instruction controlling the motion of a model vehicle comprises the control instruction controlling the steering of the model vehicle.

4. The method of claim 1, wherein the control instruction controlling the motion of a model vehicle comprises the control instruction controlling the braking of the model vehicle.

5. The method of claim 1, wherein the control instruction controlling the motion of a model vehicle comprises the control instruction controlling the throttle of the model vehicle.

6. The method of claim 1, further comprising:
   in response to the model vehicle transmit controller determining the identifier of the first model vehicle receiver is stored in the plurality of identifiers:
      the model vehicle transmit controller identifying a start of packet code and cyclic redundancy check for communication with the first model vehicle receiver;
      the model vehicle transmit controller storing the start of packet code as a last used start of packet code; and
      the model vehicle transmit controller storing the cyclic redundancy check as a last used cyclic redundancy check; and
   wherein the model vehicle transmit controller transmitting a control instruction on the last used radio channel comprises the model vehicle transmit controller transmitting the control instruction using the last used start of packet code and the last used cyclic redundancy check.

7. The method of claim 1, wherein the control instruction controlling the motion of a model vehicle comprises the control instruction controlling the operation of at least one of a model vehicle motor controller and a model vehicle servo.

8. A model vehicle radio control transmit controller configured to communicate with exactly one model vehicle radio control receiver, the model vehicle radio control transmit controller configured to:
   store a plurality of identifiers, each identifier comprising an identifier of a model vehicle radio control receiver;
   receive a link request from a first model vehicle radio control receiver, the link request comprising an identifier of the first model vehicle receiver;
   determine the identifier of the first model vehicle receiver is stored in the plurality of identifiers;
   in response to the model vehicle transmit controller determining the identifier of the first model vehicle receiver is stored in the plurality of identifiers:
      transmit a link response to the first model vehicle receiver;
      identify a radio channel for communication with the first model vehicle receiver; and
      store the radio channel as a last used radio channel; and
   in response to a powering on of the model vehicle transmit controller subsequent to the storing of the radio channel:
      transmit a control instruction on the last used radio channel, the control instruction controlling the motion of a model vehicle; and
      receive a link acknowledge signal from the first model vehicle radio control receiver.

9. The model vehicle radio control transmit controller of claim 8, wherein the link response causes the model vehicle transmit controller to establish a communications link with the first receiver and the model vehicle radio control transmit controller is further configured to not respond to signals from any receiver other than the first model vehicle receiver while the communications link exists.

10. The model vehicle radio control transmit controller of claim 8, wherein the model vehicle radio transmit controller is configured to receive the link acknowledge signal on a radio channel other than the last used radio channel.

11. The model vehicle radio control transmit controller of claim 8, wherein the control instruction controlling the motion of a model vehicle comprises the control instruction controlling the steering of the model vehicle.

12. The model vehicle radio control transmit controller of claim 8, wherein the control instruction controlling the motion of a model vehicle comprises the control instruction controlling the braking of the model vehicle.

13. The model vehicle radio control transmit controller of claim 8, wherein the control instruction controlling the motion of a model vehicle comprises the control instruction controlling the throttle of the model vehicle.

14. The model vehicle transmit controller of claim 8, wherein the configuration is further to:
   in response to determining the identifier of the first model vehicle receiver is stored in the plurality of identifiers:
      identify a start of packet code and cyclic redundancy check for communication with the first model vehicle receiver;
      store the start of packet code as a last used start of packet code; and
      store the cyclic redundancy check as a last used cyclic redundancy check; and
   in response to the powering on of the model vehicle transmit controller subsequent to the storing of the radio channel, transmit the control instruction on the last used radio channel using the last used start of packet code and the last used cyclic redundancy check.

15. The model vehicle transmit controller of claim 8, wherein the control instruction controlling the motion of a model vehicle comprises the control instruction controlling the operation of at least one of a model vehicle motor controller and a model vehicle servo.

16. A method for a model vehicle receiver communicating with a model vehicle radio control transmit controller exclusive of other model vehicle radio control receivers comprising:
   storing a plurality of identifiers in a model vehicle radio control receiver, each identifier comprising an identifier of a model vehicle radio control transmit controller;
   the model vehicle receiver transmitting a link request, the link request comprising an identifier of the model vehicle radio control receiver;
   the model vehicle receiver receiving a link response comprising an identifier of a first model vehicle transmit controller;
   the model vehicle receiver determining the identifier of the first model vehicle transmit controller is stored in the plurality of identifiers;
   in response to the model vehicle receiver determining the identifier of the model vehicle receiver is stored in the plurality of identifiers:
      the model vehicle receiver identifying a radio channel for communication with the first model vehicle transmit controller; and
      the model vehicle receiver storing the radio channel as a last used radio channel;
   in response to a powering on of the model vehicle receiver subsequent to the storing of the radio channel:
      the model vehicle receiver listening on the last used radio channel for a control instruction from the first model vehicle transmit controller;
      the model vehicle receiver receiving the control instruction from the first model vehicle transmit controller;
      the model vehicle receiver transmitting a link acknowledge signal to the first model vehicle transmit controller; and
      the model vehicle receiver controlling the motion of a model vehicle in accordance with the control instruction.

17. The method of claim 15, wherein the link acknowledge signal is transmitted on a radio channel other than the last used radio channel.

18. The method of claim 16, wherein the model vehicle receiver controlling the motion of the model vehicle in accordance with the control instruction comprises the model vehicle receiver controlling the steering of the model vehicle in accordance with the control instruction.

19. The method of claim 16, wherein the model vehicle receiver controlling the motion of the model vehicle in accordance with the control instruction comprises the model vehicle receiver controlling the braking of the model vehicle in accordance with the control instruction.

20. The method of claim 16, wherein the model vehicle receiver controlling the motion of the model vehicle in accordance with the control instruction comprises the model vehicle receiver controlling the throttle of the model vehicle in accordance with the control instruction.

21. The method of claim 16, further comprising:
   in response to the model vehicle receiver determining the identifier of the first model vehicle transmit controller is stored in the plurality of identifiers:
      the model vehicle receiver identifying a start of packet code and cyclic redundancy check for communication with the first model vehicle transmit controller;
      the model vehicle receiver storing the start of packet code as a last used start of packet code; and
      the model vehicle receiver storing the cyclic redundancy check as a last used cyclic redundancy check; and
   wherein the model vehicle receiver listening on the last used radio channel for a control instruction from the first model vehicle transmit controller comprises the model vehicle receiver listening using the last used start of packet code and the last used cyclic redundancy check.

22. The method of claim 16, wherein the model vehicle receiver controlling the motion of a model vehicle in accordance with the control instruction comprises the model vehicle receiver operating at least one of a model vehicle motor controller and a model vehicle servo in accordance with the control instruction.

23. A model vehicle radio control receiver configured to communicate with a model vehicle radio control transmit controller exclusive of other model vehicle radio control receivers, the model vehicle radio control receiver configured to:
   store a plurality of identifiers, each identifier comprising an identifier of a model vehicle radio control transmit controller;
   transmit a link request, the link request comprising an identifier of the model vehicle radio control receiver;
   receive a link response comprising an identifier of a first model vehicle transmit controller;

determine the identifier of the first model vehicle transmit controller is stored in the plurality of identifiers;
in response to the model vehicle receiver determining the identifier of the model vehicle receiver is stored in the plurality of identifiers:
identify a radio channel for communication with the first model vehicle transmit controller; and
store the radio channel as a last used radio channel;
in response to a powering on of the model vehicle receiver subsequent to the storing of the radio channel:
listen on the last used radio channel for a control instruction from the first model vehicle transmit controller;
receive the control instruction from the first model vehicle transmit controller;
transmit a link acknowledge signal to the first model vehicle transmit controller; and
control the motion of a model vehicle in accordance with the control instruction.

24. The method of claim 1, wherein the link acknowledge signal is received on a radio channel other than the last used radio channel.

25. The model vehicle receiver of claim 23, wherein the model vehicle receiver is configured to transmit the link acknowledge signal on a radio channel other than the last used radio channel.

26. The model vehicle radio control receiver of claim 23, wherein the receiver being configured to control the motion of the model vehicle in accordance with the control instruction comprises the receiver being configured to control the steering of the model vehicle in accordance with the control instruction.

27. The model vehicle radio control receiver of claim 23, wherein the receiver being configured to control the motion of the model vehicle in accordance with the control instruction comprises the receiver being configured to control the braking of the model vehicle in accordance with the control instruction.

28. The model vehicle radio control receiver of claim 23, wherein the receiver being configured to control the motion of the model vehicle in accordance with the control instruction comprises the receiver being configured to control the throttle of the model vehicle in accordance with the control instruction.

29. The model vehicle radio control receiver of claim 23, wherein the configuration is further to:
in response to determining the identifier of the first model vehicle transmit controller is stored in the plurality of identifiers:
identify a start of packet code and cyclic redundancy check for communication with the first model vehicle transmit controller;
store the start of packet code as a last used start of packet code; and
store the cyclic redundancy check as a last used cyclic redundancy check; and
in response to the powering on of the receiver subsequent to the storing of the radio channel, listen on the last used radio channel for a control instruction from the first model vehicle transmit controller using the last used start of packet code and the last used cyclic redundancy check.

30. The model vehicle radio control receiver of claim 23, wherein the configuration is further to control the motion of the model vehicle in accordance with the control instruction by operating at least one of a model vehicle motor controller and a model vehicle servo in accordance with the control instruction.

31. A method for a model vehicle radio control receiver establishing a link with a model vehicle radio control transmit controller comprising:
storing a plurality of identifiers in a model vehicle radio control receiver, each identifier comprising an identifier of a model vehicle radio control transmit controller;
the model vehicle receiver receiving a first signal from a first model vehicle transmit controller, the first signal comprising an identifier of the first model vehicle transmit controller;
the model vehicle receiver determining the identifier of the first model vehicle transmit controller is stored in the plurality of identifiers;
in response to the model vehicle receiver determining the identifier of the first model vehicle transmit controller is stored in the plurality of identifiers:
the model vehicle receiver identifying a radio channel for communication with the first model vehicle transmit controller; and
the model vehicle receiver storing the radio channel as a last used radio channel;
in response to a powering on of the model vehicle receiver subsequent to the storing of the radio channel, the model vehicle receiver listening on the last used radio channel for a control instruction from the first model vehicle transmit controller;
the model vehicle receiver receiving the control instruction from the first model vehicle transmit controller; and
the model vehicle receiver controlling the motion of a model vehicle in accordance with the control instruction.

32. The method of claim 31, further comprising:
the model vehicle receiver transmitting a second signal to the first model vehicle transmit controller; and
wherein the first signal comprises a response to the second signal.

33. The method of claim 32, wherein:
the second signal comprises a link request; and the first signal comprises a response to the link request.

34. The method of claim 31, further comprising:
in response to the model vehicle receiver determining the identifier of the first model vehicle transmit controller is stored in the plurality of identifiers:
the model vehicle receiver identifying a start of packet code and cyclic redundancy check for communication with the first model vehicle transmit controller;
the model vehicle receiver storing the start of packet code as a last used start of packet code; and
the model vehicle receiver storing the cyclic redundancy check as a last used cyclic redundancy check; and
wherein the model vehicle receiver listening on the last used radio channel for a control instruction from the first model vehicle transmit controller comprises the model vehicle receiver listening using the last used start of packet code and the last used cyclic redundancy check.

35. The method of claim 31, wherein the model vehicle receiver controlling the motion of a model vehicle in accordance with the control instruction comprises the model vehicle receiver operating at least one of a model vehicle motor controller and a model vehicle servo in accordance with the control instruction.

36. The method of claim 31, wherein the model vehicle receiver controlling the motion of the model vehicle in accordance with the control instruction comprises the model vehicle receiver controlling the steering of the model vehicle in accordance with the control instruction.

37. The method of claim 31, wherein the model vehicle receiver controlling the motion of the model vehicle in accordance with the control instruction comprises the model vehicle receiver controlling the braking of the model vehicle in accordance with the control instruction.

38. The method of claim 31, wherein the model vehicle receiver controlling the motion of the model vehicle in accordance with the control instruction comprises the model vehicle receiver controlling the throttle of the model vehicle in accordance with the control instruction.

39. A model vehicle radio control receiver for establishing a link with a model vehicle radio control transmit controller, the model vehicle radio control receiver comprising a configuration to:
- store a plurality of identifiers, each identifier comprising an identifier of a model vehicle radio control transmit controller;
- receive a first signal from a first model vehicle transmit controller, the first signal comprising an identifier of the first model vehicle transmit controller;
- determine the identifier of the first model vehicle transmit controller is stored in the plurality of identifiers;
- in response to determining the identifier of the first model vehicle transmit controller is stored in the plurality of identifiers:
  - identify a radio channel for communication with the first model vehicle transmit controller; and
  - store the radio channel as a last used radio channel;
- in response to a powering on of the receiver subsequent to the storing of the radio channel, listen on the last used radio channel for a control instruction from the first model vehicle transmit controller;
- receive the control instruction from the first model vehicle transmit controller; and control the motion of a model vehicle in accordance with the control instruction.

40. The model vehicle radio control receiver of claim 39, wherein the configuration is further to transmit a second signal to the first model vehicle transmit controller, and wherein the first signal comprises a response to the second signal.

41. The model vehicle radio control receiver of claim 40, wherein:
- the second signal comprises a link request; and
- the first signal comprises a response to the link request.

42. The model vehicle radio control receiver of claim 39, wherein the configuration is further to:
- in response to determining the identifier of the first model vehicle transmit controller is stored in the plurality of identifiers:
  - identify a start of packet code and cyclic redundancy check for communication with the first model vehicle transmit controller;
  - store the start of packet code as a last used start of packet code; and
  - store the cyclic redundancy check as a last used cyclic redundancy check; and
- in response to the powering on of the receiver subsequent to the storing of the radio channel, listen on the last used radio channel for a control instruction from the first model vehicle transmit controller using the last used start of packet code and the last used cyclic redundancy check.

43. The model vehicle radio control receiver of claim 39, wherein the configuration is further to control the motion of the model vehicle in accordance with the control instruction by operating at least one of a model vehicle motor controller and a model vehicle servo in accordance with the control instruction.

44. The model vehicle radio control receiver of claim 39, wherein the receiver being configured to control the motion of the model vehicle in accordance with the control instruction comprises the receiver being configured to control the steering of the model vehicle in accordance with the control instruction.

45. The model vehicle radio control receiver of claim 39, wherein the receiver being configured to control the motion of the model vehicle in accordance with the control instruction comprises the receiver being configured to control the braking of the model vehicle in accordance with the control instruction.

46. The model vehicle radio control receiver of claim 39, wherein the receiver being configured to control the motion of the model vehicle in accordance with the control instruction comprises the receiver being configured to control the throttle of the model vehicle in accordance with the control instruction.

* * * * *

UNITED STATES PATENT AND TRADEMARK OFFICE
CERTIFICATE OF CORRECTION

PATENT NO. : 8,995,927 B2
APPLICATION NO. : 12/730036
DATED : March 31, 2015
INVENTOR(S) : Gary M. DeWitt et al.

It is certified that error appears in the above-identified patent and that said Letters Patent is hereby corrected as shown below:

Claims

Claim 16, Column 17, line(s) 63 should read

A method for a model vehicle receiver communicating with a model vehicle radio control transmit controller exclusive of other model vehicle radio control receivers comprising: storing a plurality of identifiers in a model vehicle radio control receiver, each identifier comprising an identifier of a model vehicle radio control transmit controller; the model vehicle receiver transmitting a link request, the link request comprising an identifier of the model vehicle radio control receiver; the model vehicle receiver receiving a link response comprising an identifier of a first model vehicle transmit controller; the model vehicle receiver determining the identifier of the first model vehicle transmit controller is stored in the plurality of identifiers; in response to the model vehicle receiver determining the identifier of the model vehicle transmit controller is stored in the plurality of identifiers: the model vehicle receiver identifying a radio channel for communication with the first model vehicle transmit controller; and the model vehicle receiver storing the radio channel as a last used radio channel; in response to a powering on of the model vehicle receiver subsequent to the storing of the radio channel: the model vehicle receiver listening on the last used radio channel for a control instruction from the first model vehicle transmit controller; the model vehicle receiver receiving the control instruction from the first model vehicle transmit controller; the model vehicle receiver transmitting a link acknowledge signal to the first model vehicle transmit controller; and the model vehicle receiver controlling the motion of a model vehicle in accordance with the control instruction.

Claim 17, Column 18, line(s) 4 should read

The method of claim 16, wherein the link acknowledge signal is transmitted on a radio channel other than the last used radio channel.

Signed and Sealed this
Seventh Day of June, 2016

Michelle K. Lee
*Director of the United States Patent and Trademark Office*

CERTIFICATE OF CORRECTION (continued)
U.S. Pat. No. 8,995,927 B2

Claims

Claim 23, Column 19, line(s) 4 should read

A model vehicle radio control receiver configured to communicate with a model vehicle radio control transmit controller exclusive of other model vehicle radio control receivers, the model vehicle radio control receiver configured to: store a plurality of identifiers, each identifier comprising an identifier of a model vehicle radio control transmit controller; transmit a link request, the link request comprising an identifier of the model vehicle radio control receiver; receive a link response comprising an identifier of a first model vehicle transmit controller; determine the identifier of the first model vehicle transmit controller is stored in the plurality of identifiers; in response to the model vehicle receiver determining the identifier of the model vehicle transmit controller is stored in the plurality of identifiers: identify a radio channel for communication with the first model vehicle transmit controller; and store the radio channel as a last used radio channel; in response to a powering on of the model vehicle receiver subsequent to the storing of the radio channel: listen on the last used radio channel for a control instruction from the first model vehicle transmit controller; receive the control instruction from the first model vehicle transmit controller; transmit a link acknowledge signal to the first model vehicle transmit controller; and control the motion of a model vehicle in accordance with the control instruction.